Aug. 28, 1951 J. WICKS 2,566,009

INTEREXCHANGE SWITCHING TELEPHONE SYSTEM

Filed Dec. 12, 1947 9 Sheets-Sheet 1

INVENTOR.
John Wicks

BY
Smith, Olsen & Baird

Attys.

INVENTOR.
John Wicks
BY
Smith, Olsen & Baird
Attys.

Aug. 28, 1951 J. WICKS 2,566,009

INTEREXCHANGE SWITCHING TELEPHONE SYSTEM

Filed Dec. 12, 1947 9 Sheets-Sheet 3

INVENTOR
John Wicks

By

Smith, Olsen & Baird

Attys.

Aug. 28, 1951 J. WICKS 2,566,009

INTEREXCHANGE SWITCHING TELEPHONE SYSTEM

Filed Dec. 12, 1947 9 Sheets-Sheet 4

INVENTOR.
John Wicks

BY
Smith, Olsen & Baird
Attys.

*INVENTOR.*
John Wicks
*BY* Smith, Olsen & Baird
Attys.

*INVENTOR.*
John Wicks
*BY* Smith, Olsen & Baird
Attys

INVENTOR.
John Wicks
BY
Smith, Olsen & Baird
Attys

INVENTOR.
John Wicks
BY
Smith, Olsen & Baird
Attys.

Aug. 28, 1951 J. WICKS 2,566,009

INTEREXCHANGE SWITCHING TELEPHONE SYSTEM

Filed Dec. 12, 1947 9 Sheets-Sheet 9

INVENTOR.
John Wicks

BY Smith, Olsen & Baird

Attys.

Patented Aug. 28, 1951

2,566,009

UNITED STATES PATENT OFFICE 2,566,009

INTEREXCHANGE SWITCHING TELEPHONE SYSTEM

John Wicks, Biloxi, Miss., assignor to Automatic Electric Laboratories, Inc., Chicago, Ill., a corporation of Delaware Application December 12, 1947, Serial No. 791,298

13 Claims. (Cl. 179—18)

Figure 1:
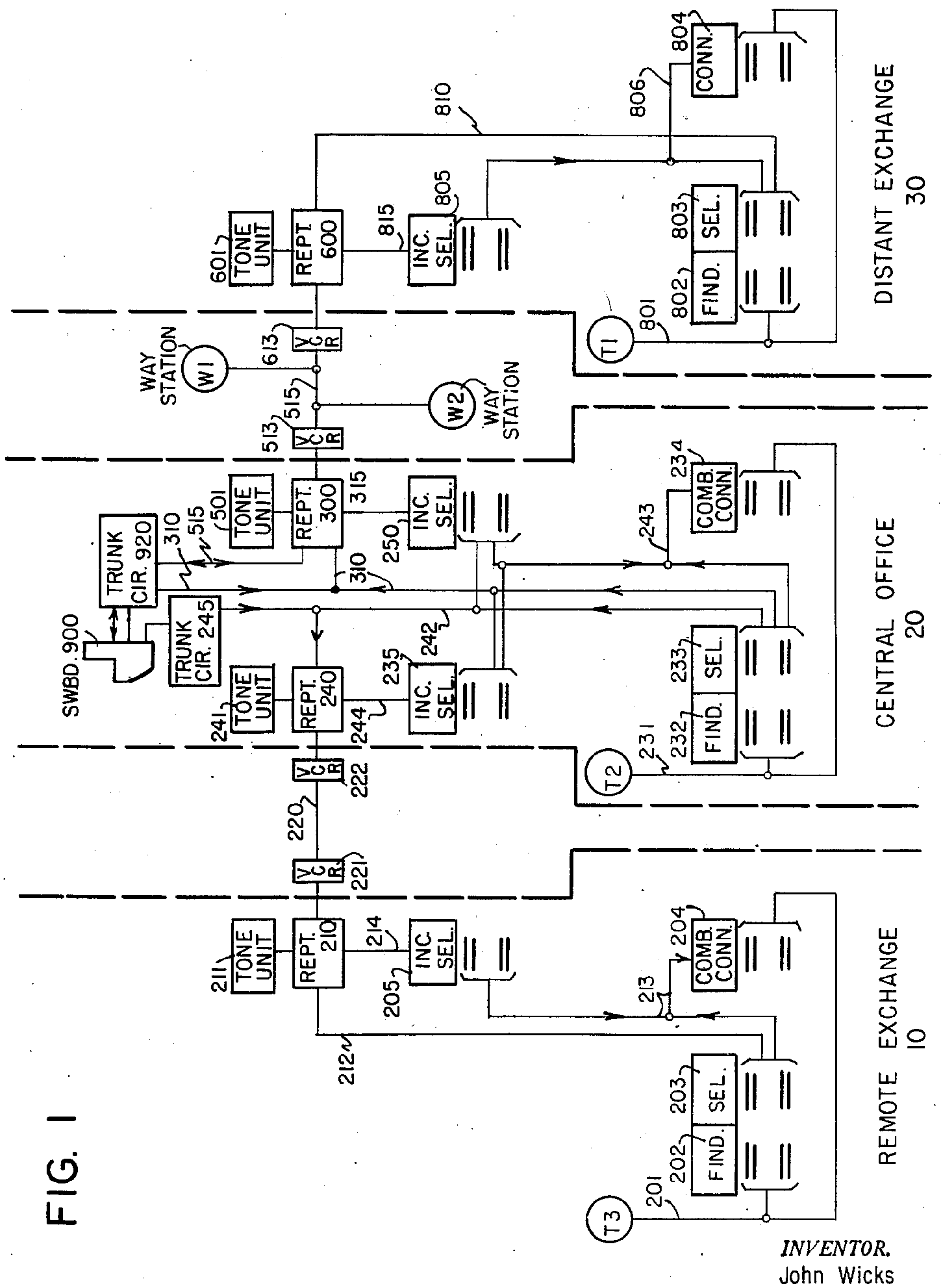
Figure 2:
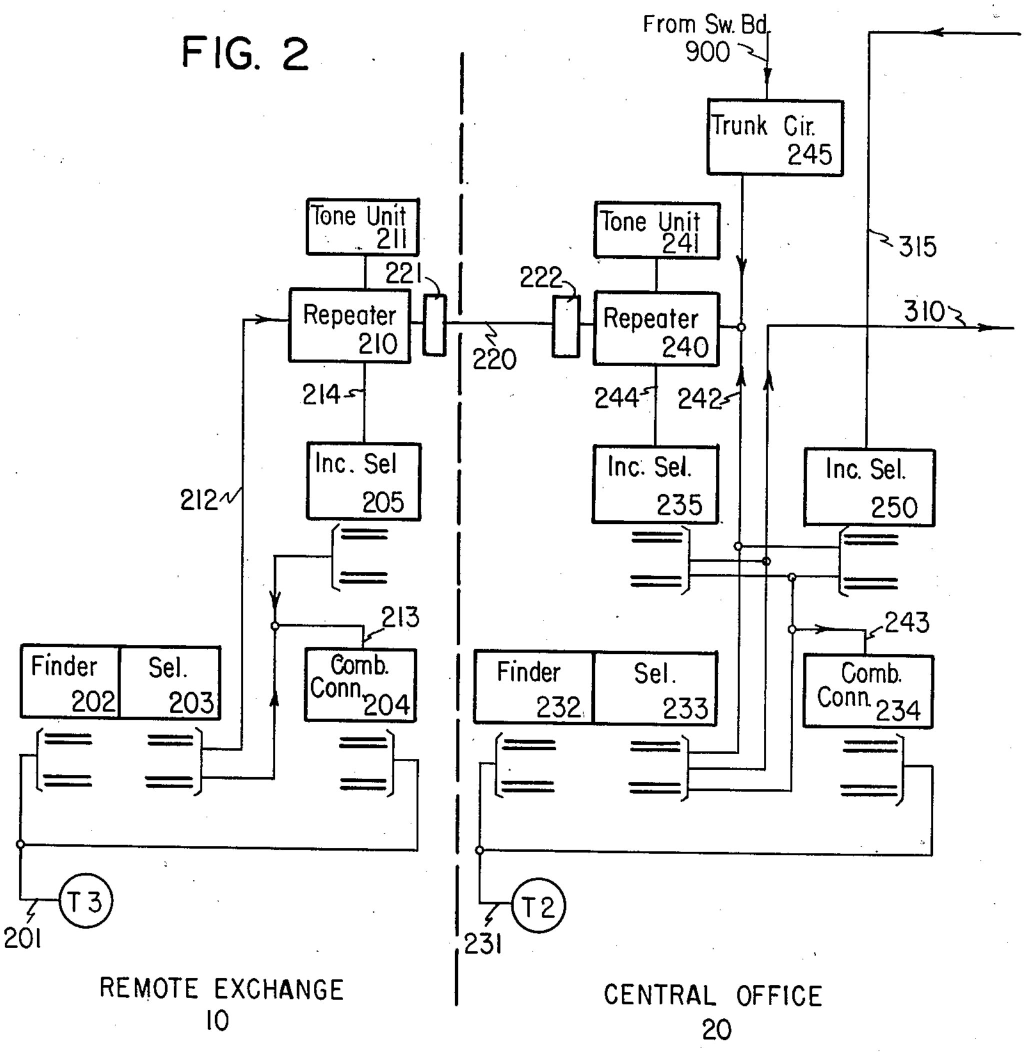

The present invention relates to automatic telephone systems, and more particularly to such systems of the interexchange switching type.

In automatic telephone systems, recently it has become feasible to permit subscribers at substations in the different exchanges of the system to set up telephone connections utilizing automatic switching apparatus and involving exchanges disposed considerable distances apart; which connections have always heretofore been completed by operators at switchboards in central offices and otherwise handled strictly on a toll basis. This situation presents a number of operating problems since a substantial number of the existing trunk lines interconnecting remotely disposed exchanges are of such length that they incorporate amplifiers of the vacuum tube type embodying automatic volume control features; which amplifiers are ordinarily so constructed and arranged that they will pass only audio frequency signals. Consequently, it is impossible to employ, in conjunction with these trunk lines, ordinary dialing schemes for the purpose of controlling the automatic switching apparatus.

This general problem has been encountered heretofore in toll switching telephone systems as disclosed in U. S. Patent No. 2,155,176, granted on April 18, 1939, to John Wicks, wherein a toll switching telephone system is provided that comprises audio frequency carrier repeaters governed by operators at switchboards in central offices. Also an improved toll switching telephone system of this type is disclosed in the copending application of John Wicks and Otho D. Grandstaff, Serial No. 749,758, filed May 22, 1947, now Patent No. 2,517,516, granted August 1, 1950, the last-mentioned system incorporating an improved tone unit disclosed in the copending application of Otho D. Grandstaff, Serial No. 738,194, filed March 29, 1947, now Patent No. 2,482,478, granted September 20, 1949.

While the repeaters of these toll switching telephone systems are capable of controlling automatic switching appartus over long toll lines incorporating amplifiers of the type noted, these repeaters are so constructed and arranged that they, in turn, must be governed by operators at switchboards in central offices.

Accordingly, it is a general object of the present invention to provide an automatic telephone system wherein subscribers at substations in the different exchanges of the system may set up connections utilizing automatic switching apparatus and involving exchanges disposed considerable distances apart.

Another object of the invention is to provide an automatic telephone system of the type noted, comprising exchanges interconnected by trunk lines incorporating amplifiers of the vacuum tube type capable of passing only audio frequency signals.

Another object of the invention is to provide an audio frequency carrier repeater that is so constructed and arranged that it may be governed from a subscriber substation.

Another object of the invention is to provide an audio frequency carrier repeater that is so constructed and arranged that it is capable of returning supervisory signals in such form that they may be received and comprehended at a subscriber substation.

A further object of the invention is to provide an audio frequency carrier repeater of improved circuit connection and arrangement.

A still further object of the invention is to provide in an automatic telephone system of the type noted, which also comprises a switchboard and one or more way stations, an improved arrangement for setting up connections between the switchboard and the way station via a trunk line, without interference with the setting up of connections between the subscriber substations in two remotely disposed exchanges over the trunk line.

Further features of the invention pertain to the particular arrangement of the circuit elements of the system, whereby the above-outlined and additional operating features thereof are attained.

*Sect. 1.—The general arrangement of the telephone system*

The invention, both as to its organization and method of operation, together with further objects and advantages thereof, will best be understood by reference to the following specification taken in connection with the accompanying drawings in which Figure 1 is a schematic diagram of the area served by a telephone system embodying the present invention and illustrating the general arrangement of the apparatus incorporated in several of the exchanges and the office thereof; and Figs. 2 to 9, inclusive, taken together, illustrate the details of certain of the apparatus incorporated in the central office and in the distant exchange of the telephone system, which apparatus has embodied therein, the feature of the invention as briefly outlined above. Specifically, in order to form a unified diagram, Figs. 2 to 8, inclusive, should be arranged vertically in side-by-side relation from left to right, and Fig.

Figure 10:
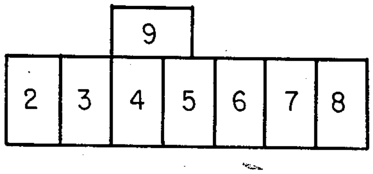
Figure 4:
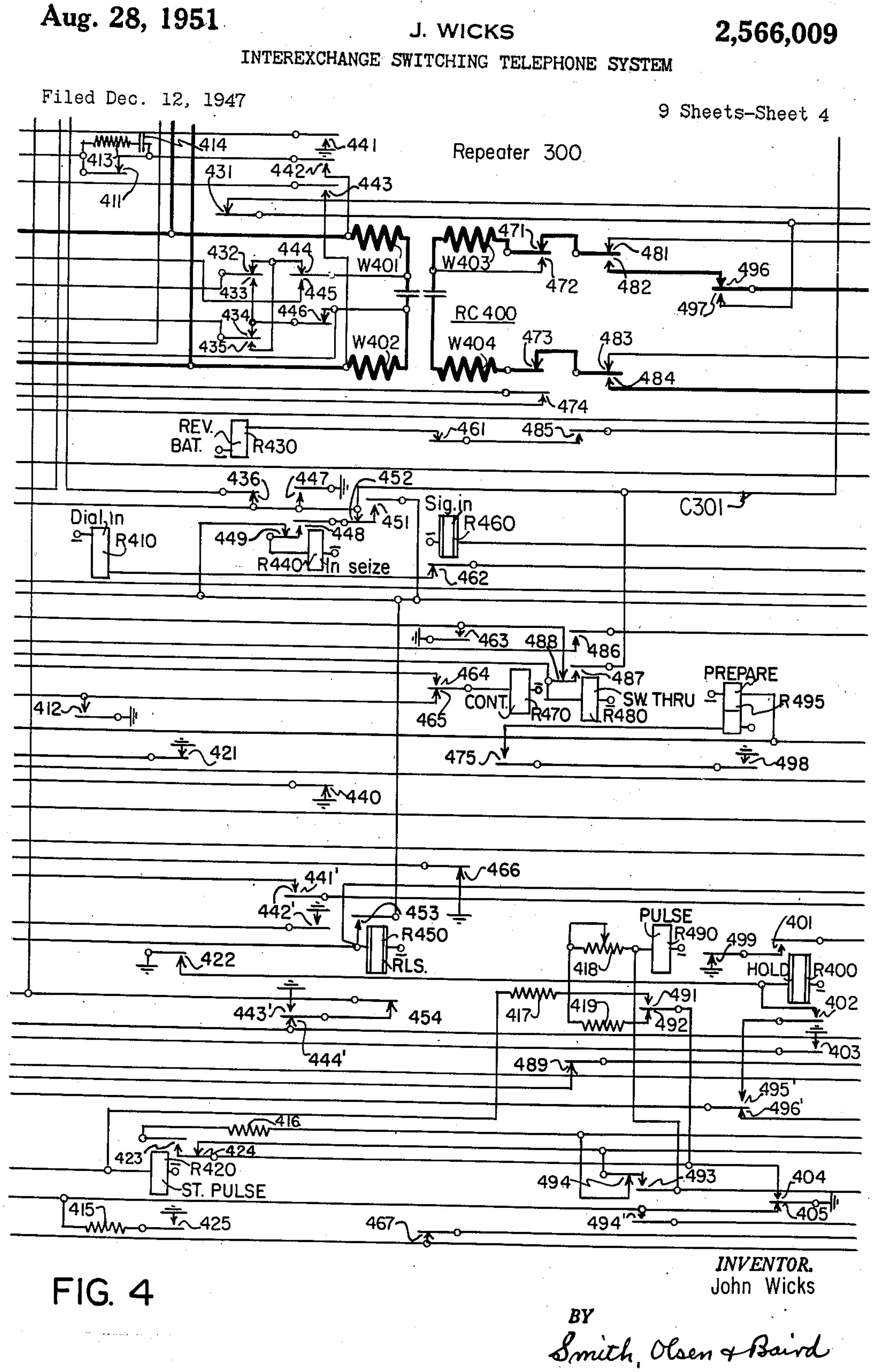
Figure 5:
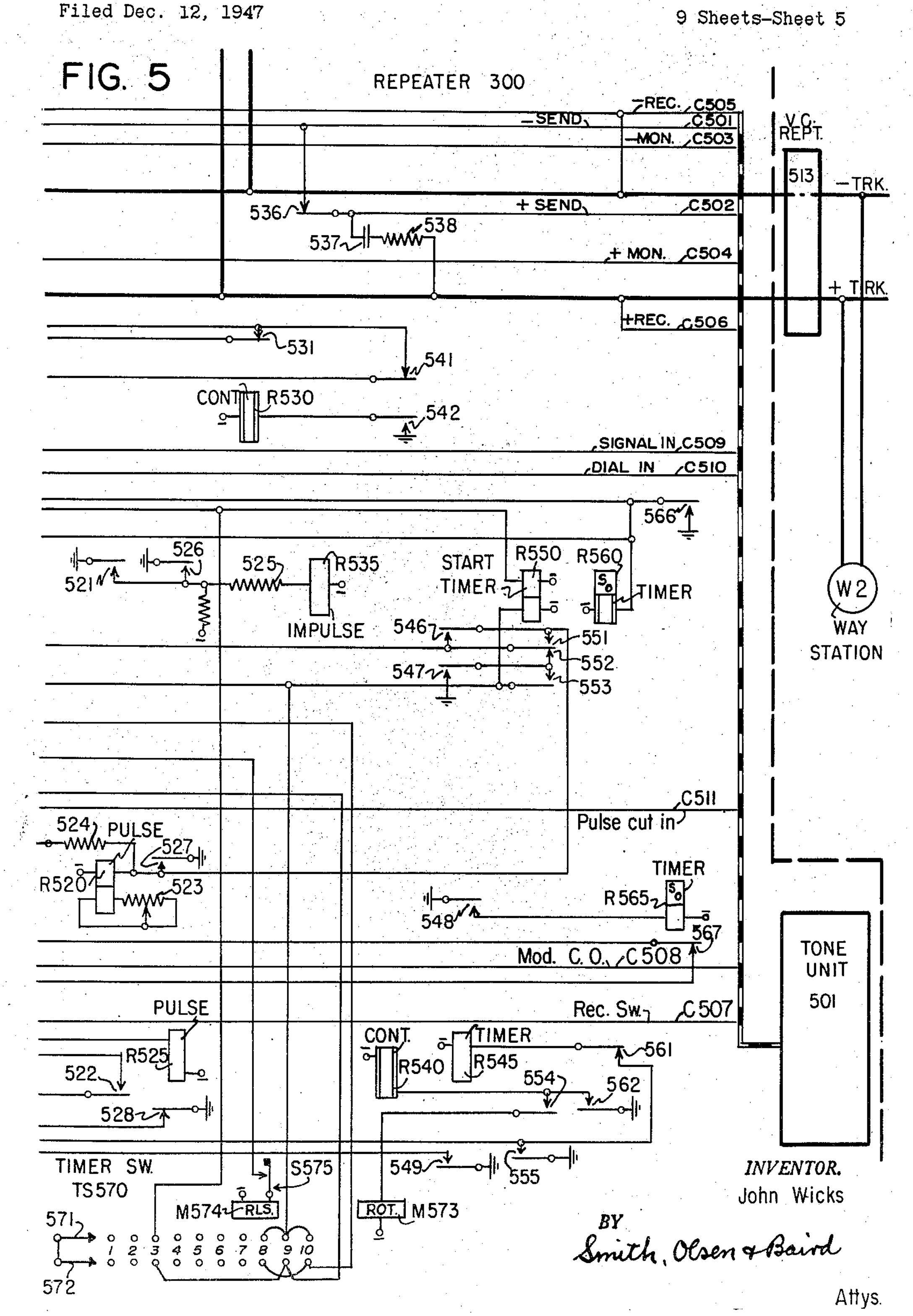

9 should be arranged horizontally above Fig. 4 and partially above Fig. 5, as illustrated in Fig. 10.

Figure 3:
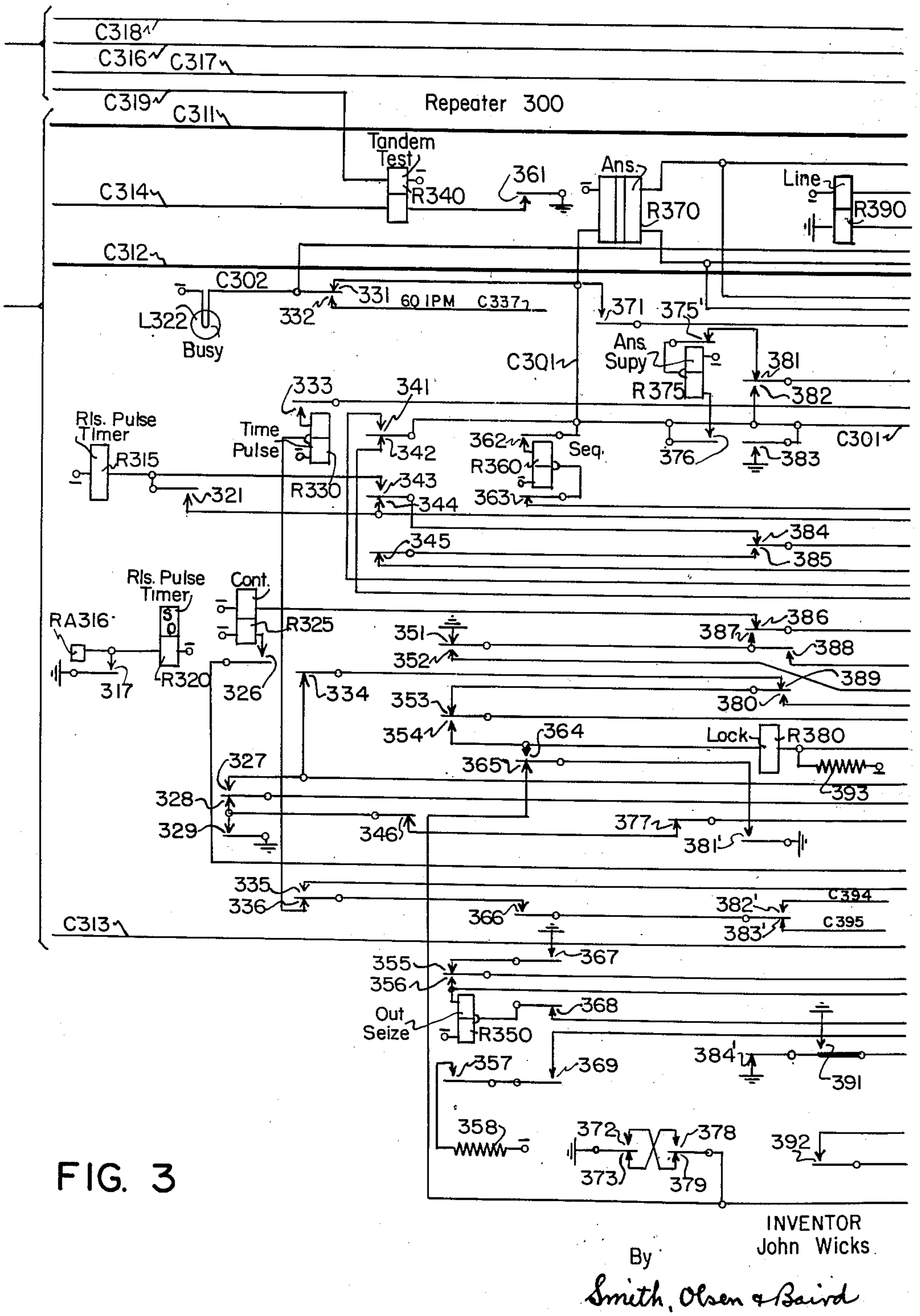
Figure 6:
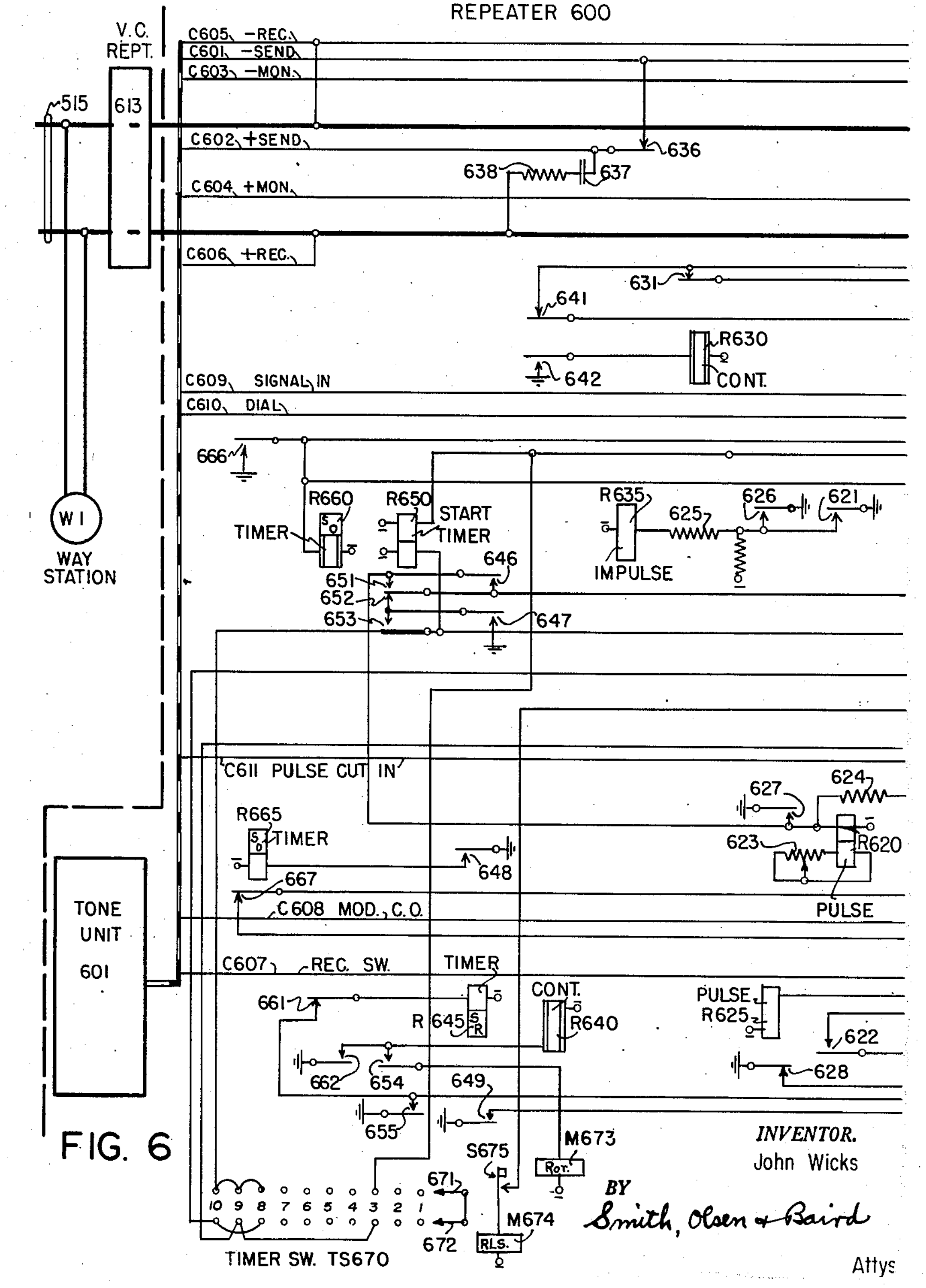
Figure 7:
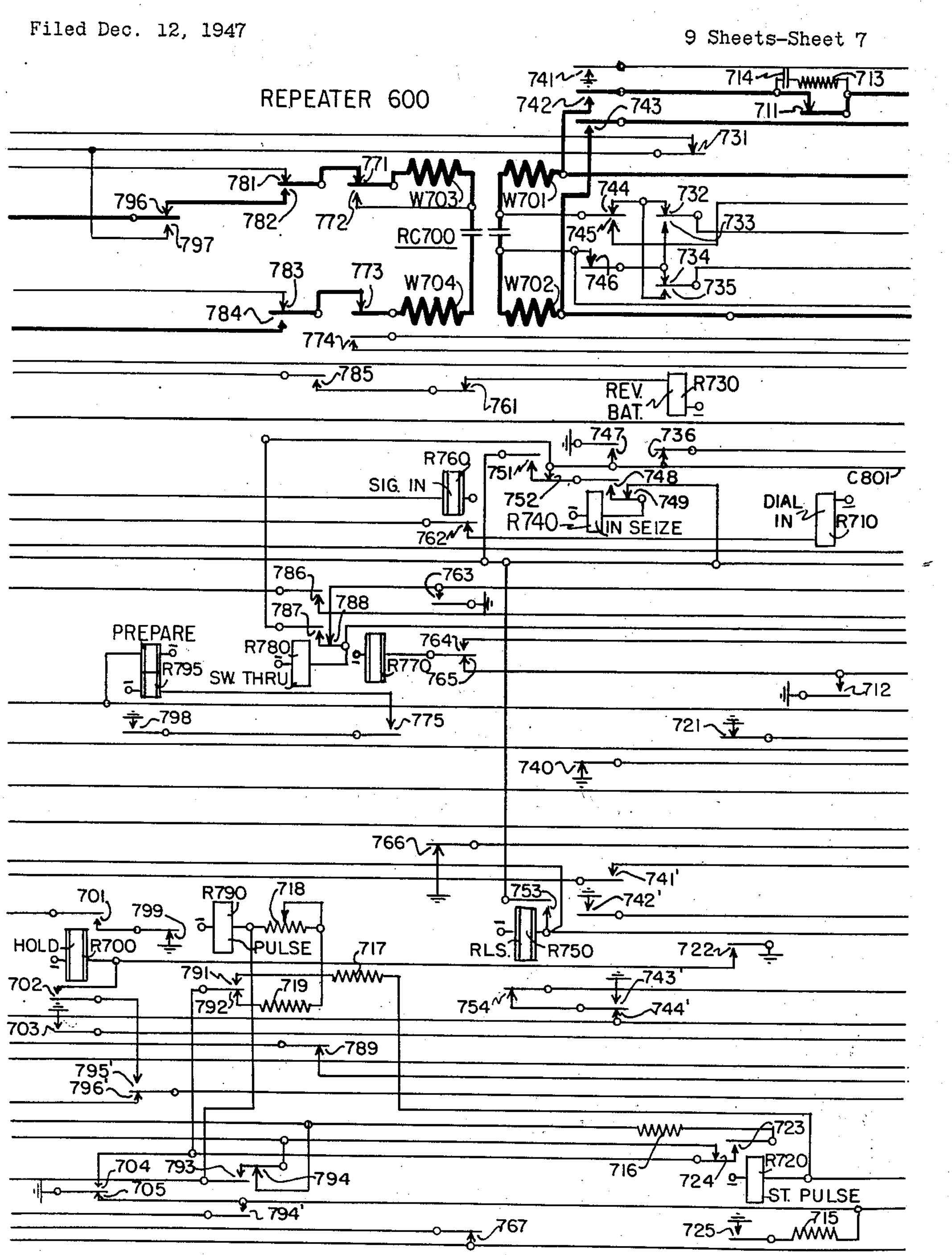
Figure 8:
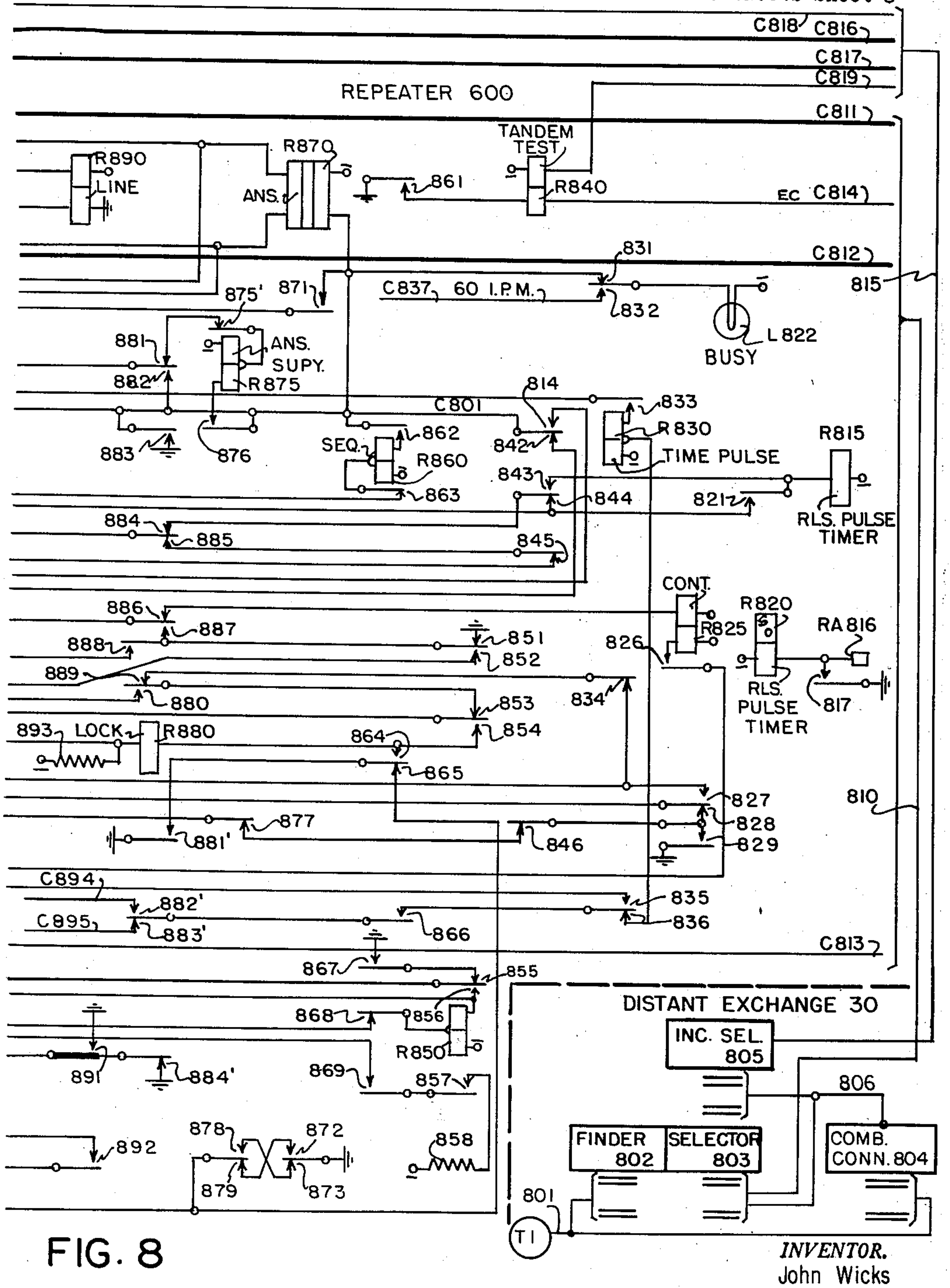
Figure 9:
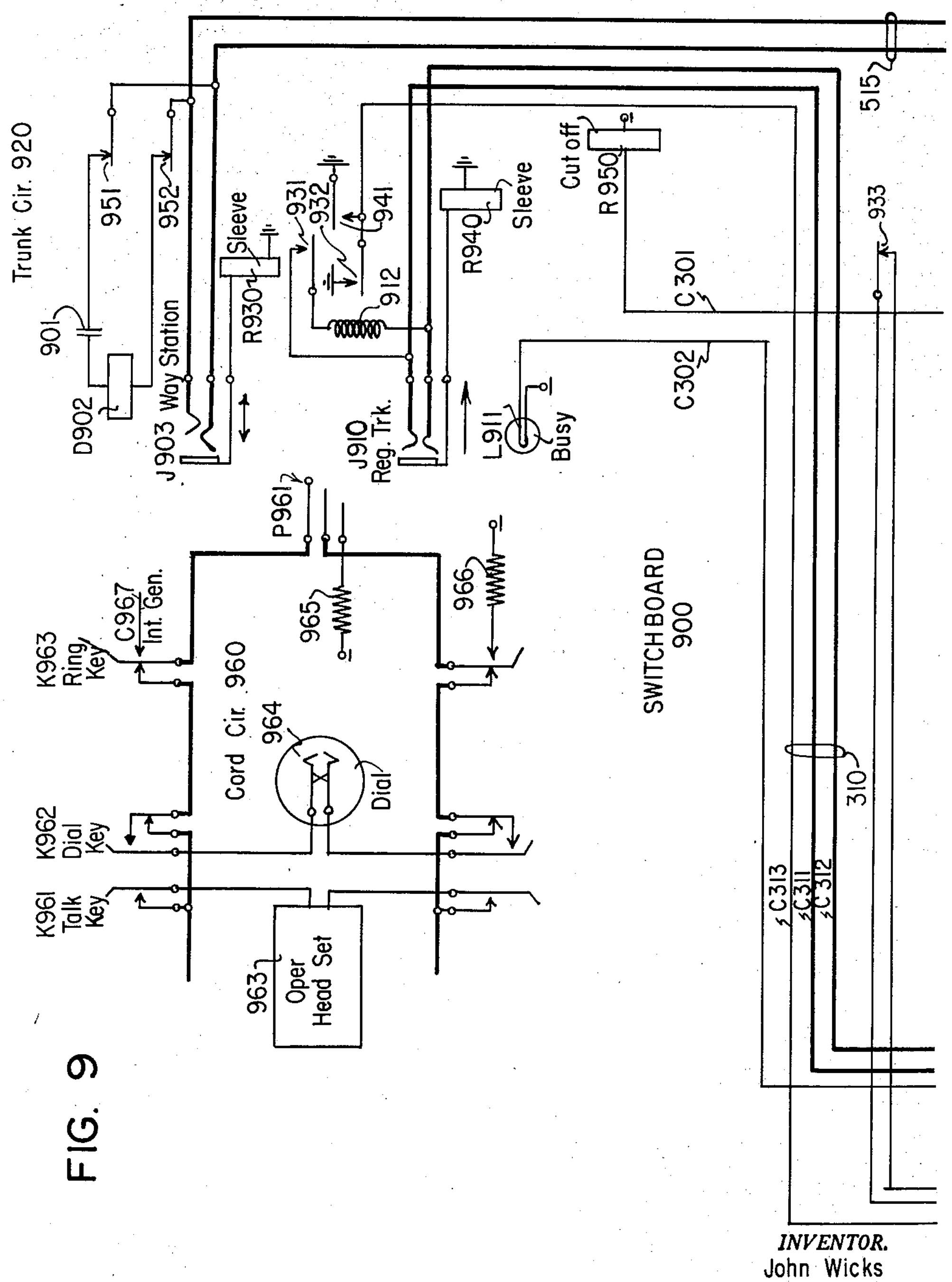

More particularly, Figs. 3 to 5, inclusive, illustrate the details of one of the repeater circuits incorporated in the central office; Figs. 6 to 8, inclusive, illustrate the details of one of the repeater circuits incorporated in the distant exchange; and Fig. 9 illustrates the details of one of the cord circuits and of one of the trunk circuits disposed at the switchboard in the central office.

Referring now more particularly to Fig. 1, the telephone system there illustrated serves an area comprising a remote exchange 10, a central office 20, and a distant exchange 30. The remote exchange 10 is of the automatic type, serving a number of subscriber substations, including the subscriber substation T3, and comprising automatic switching apparatus. Similarly, the central office 20 is of the automatic type, serving a number of subscriber substations, including the subscriber substation T2, and comprising automatic switching apparatus. Likewise, the distant exchange 30 is of the automatic type, serving a number of subscriber substations, including the subscriber substation T1, and comprising automatic switching apparatus. The switching apparatus provided in the remote exchange 10 comprises a number of groups of finder-selector links, the first group including the link constituting the finder 202 and the selector 203; as well as a number of groups of combination toll and local connectors, the first group including the combination connector 204. The finder 202 has access to the first group of subscriber lines, including the subscriber line 201 extending to the subscriber substation T3; and the combination connector 204 is accessible to the selector 203 via a trunk 213 and, in turn, has access to the first group of subscriber lines mentioned. Similarly, the switching apparatus provided in the central office 20 comprises a number of groups of finder-selector links, the first group including the link consisting of the finder 232 and the selector 233; as well as a number of groups of combination toll and local connectors, the first group including the combination connector 234. The finder 232 has access to the first group of subscriber lines, including the subscriber line 231 extending to the subscriber substation T2; and the combination connector 234 is accessible to the selector 233 via a trunk 243 and, in turn, has access to the first group of subscriber lines mentioned. Likewise, the switching apparatus provided in the distant exchange 30 comprises a number of groups of finder-selector links, the first group including the link consisting of the finder 802 and the selector 803; as well as a number of groups of combination toll and local connectors, the first group including the combination connector 804. The finder 802 has access to the first group of subscriber lines, including the subscriber line 801 extending to the subscriber substation T1; and the combination connector 804 is accessible to the selector 803 via a trunk 805 and, in turn, has access to the first group of subscriber lines mentioned.

Also the remote exchange 10 comprises groups of local connectors, not shown, having access to the different groups of subscriber lines, the first group having access to the first group of subscriber lines, including the subscriber line 201 extending to the subscriber substation T3. Similarly, the central office 20 comprises groups of local connectors, not shown, having access to the different groups of subscriber lines, the first group having access to the first group of subscriber lines, including the subscriber line 231 extending to the subscriber substation T2. Likewise, the distant exchange 30 comprises groups of local connectors, not shown, having access to the different groups of subscriber lines, the first group having access to the first group of subscriber lines, including the subscriber line 801 extending to the subscriber substation T1.

The remote exchange 10 and the central office 20 are interconnected by a plurality of trunk lines, including the trunk line 220, each incorporating a plurality of voice current repeaters and terminating in repeaters respectively disposed in the remote exchange 10 and in the central office 20. For example, the trunk line 220 incorporates a number of voice current repeaters, including the voice current repeaters 221 and 222, and terminates in the repeaters 210 and 240 respectively disposed in the remote exchange 10 and in the central office 20. Each repeater in the remote exchange 10 is provided with a tone unit individual thereto, is accessible via an incoming trunk thereto, and has access via an outgoing trunk therefrom to an individually associated incoming selector. For example, the repeater 210 is provided with a tone unit 211 individual thereto, is accessible via the incoming trunk 212 thereto, and has access via the outgoing trunk 214 therefrom to the individually associated incoming selector 205. The incoming trunk 212 is accessible to the selectors 203, etc., of the associated links; while the incoming selector 205 has access to the different groups of combination connectors 204, etc. Each repeater in the central office 20 is provided with a tone unit individual thereto, is accessible via an incoming trunk thereto, and has access via an outgoing trunk therefrom to an individually associated incoming selector. For example, the repeater 240 is provided with a tone unit 241 individual thereto, is accessible via the incoming trunk 242 thereto, and has access via the outgoing trunk 244 therefrom to the individually associated incoming selector 235. The incoming trunk 242 is accessible to the selectors 233, etc., of the associated links; while the incoming selector 235 has access to the different groups of combination connectors 234, etc.

The central office 20 and the distant exchange 30 are interconnected by a plurality of trunk lines, including the trunk line 515, each incorporating a plurality of voice current repeaters and terminating in repeaters respectively disposed in the central office 20 and in the distant exchange 30. For example, the trunk line 515 incorporates a number of voice current repeaters, including the voice current repeaters 513 and 613, and terminates in the repeaters 300 and 600 respectively disposed in the central office 20 and in the distant exchange 30. Each repeater in the central office 20 is provided with a tone unit individual thereto, is accessible via an incoming trunk thereto, and has access via an outgoing trunk therefrom to an individually associated incoming selector. For example, the repeater 300 is provided with a tone unit 501 individual thereto, is accessible via the incoming trunk 310 thereto, and has access via the outgoing trunk 315 therefrom to the individually associated incoming selector 250. The incoming trunk 310 is accessible to the selectors 233, etc., of the associated links; while the incoming selector 250 has access to the different groups of combination connectors 234, etc. Each repeater in the distant exchange 30 is provided with a tone unit individual thereto, is accessible via an incoming trunk thereto, and has access via an outgoing trunk therefrom to an individually associated incoming selector. For example, the repeater 600 is provided with a tone unit 601 individual thereto, is accessible via the incoming trunk 810 thereto, and has access via the outgoing trunk 815 therefrom to the individually associated incoming selector 805. The incoming trunk 810 is accessible to the selectors 803, etc., of the associated links; while the incoming selector 805 has access to the different groups of combination connectors 804, etc.

Also, a plurality of way stations are disposed between the central office 20 and the distant exchange 30 and are connected to one of the trunk lines extending therebetween; the way stations W1 and W2 being illustrated as connected to the trunk line 515 intermediate the voice current repeaters 513 and 613 incorporated therein. Further, the central office 20 comprises a manual switchboard 900 having access to trunk circuits individually associated with the repeaters in the central office 20. More particularly, the repeater 240 terminating the trunk line 220 extending between the remote exchange 10 and the central office 20 is provided with a trunk circuit 245 individual thereto that is connected to the incoming trunk 242. Similarly, the repeater 300 terminating the trunk line 515 extending between the central office 20 and the distant exchange 30 is provided with a trunk circuit 920 individual thereto that is connected both to the incoming trunk 310 and to the trunk line 515.

Finally, in the central office 20, it is noted that the incoming selector 235 individual to the repeater 240 also has access to the incoming trunk 310 extending to the repeater 300; while the incoming selector 250 individual to the repeater 300 also has access to the incoming trunk 242 extending to the repeater 240; whereby calls originating in the remote exchange 10 may be extended through the central office 20 to the distant exchange 30, and calls originating in the distant exchange 30 may be extended through the central office 20 to the remote exchange 10.

*Sect. 2.—The apparatus incorporated in the telephone system*

In the remote exchange 10, the automatic switching apparatus, including the finders 202, etc., the selectors 203, etc., the local connectors, not shown, the combination connectors 204, etc., the incoming selectors 205, etc., are of the well-known Strowger types; the groups of finder-selector links are provided with conventional distributing apparatus, not shown; the subscriber substation T3, etc., are of the common battery type and are provided with conventional equipment; and the subscriber lines 201, etc., are provided with conventional line circuits, not shown. Similarly, in the central office 20, the automatic switching apparatus, including the finders 232, etc., the selectors, 233, etc., the local connectors, not shown, the combination connectors 234, etc., the incoming selectors 235, 250, etc., are of the well-known Strowger types; the groups of finder-selector links are provided with conventional distributing apparatus, not shown; the subscriber substations T2, etc., are of the common battery type and are provided with conventional equipment; and the subscriber lines 231, etc., are provided with conventional line circuits, not shown. Likewise, in the distant exchange 30, the automatic switching apparatus, including the finders 802, etc., the selectors 803, etc., the local connectors, not shown, the combination connectors 804, etc., the incoming selectors 805, etc., are of the well-known Strowger types; the groups of finder-selector links are provided with conventional distributing apparatus, not shown; the subscriber substations T1, etc. are of the common battery type and are provided with conventional equipment; and the subscriber lines 801, etc., are provided with conventional line circuits, not shown.

The repeaters 210, etc., in the remote exchange 10, the repeaters 240, 300, etc., in the central office 20 and the repeaters 600, etc., in the distant exchange 30 are identical. The repeater 300 in the central office 20 is illustrated in details in Figs. 3 to 5, inclusive as comprising a relay group including two release pulse timer relays R315 and R320, a control relay R325, a time pulse relay R330, a tandem test relay R340, an out-seize relay R350, a sequence relay R360, an answer relay R370, an answer supervisory relay R375, a lock relay R380, a line relay R390, a dial-in relay R410, a start pulse relay R420, a reverse battery relay R430, an in-seize relay R440, a release relay R450, a signal-in relay R460, a control relay R470, a switch-through relay R480, a pulse relay R490, a prepare relay R495, a hold relay R400, two pulse relays R520 and R525, a control relay R530, an impulse relay R535, a control relay R540, a timer relay R545, a timer start relay R550, and two timer relays R560 and R565. Also the repeater 300 comprises a repeating coil RC400, a busy lamp L322 and a timer switch TS570 of the minor type. The timer switch TS570 comprises two wipers 571 and 572 provided with an associated rotary contact bank, a rotary magnet M573 for driving the wipers noted step by step away from their home positions across the associated contact bank, and a release magnet M574 for releasing the wipers noted and for returning them to their home positions. Also, a set of switch springs S575 is associated with the wipers noted, that is actuated when they are moved away from their home positions.

Similarly, the repeater 600 in the distant exchange 30 is illustrated in detail in Figs. 6 to 8, inclusive, as comprising a relay group including two release pulse timer relays R815 and R820, a control relay R825, a time pulse relay R830, a tandem test relay R840, an out-seize relay R850, a sequence relay R860, an answer relay R870, an answer supervisory relay R875, a lock relay R880, a line relay R890, a dial-in relay R710, a start pulse relay R720, a reverse battery relay R730, an in-seize relay R740, a release relay R750, a signal-in relay R760, a control relay R770, a switch-through relay R780, a pulse relay R790, a prepare relay R795, a hold relay R700, two pulse relays R620 and R625, a control relay R630, an impulse relay R635, a control relay R640, a timer relay R645, a timer start relay R650, and two timer relays R660 and R665. Also the repeater 600 comprises a repeating coil RC700, a busy lamp L822 and a timer switch TS670 of the minor type. The timer switch TS670 comprises two wipers 671 and 672 provided with an associated rotary contact bank, a rotary magnet M673 for driving the wipers noted step by step away from their home positions across the associated contact bank, and a release magnet M674 for releasing the wipers noted and for returning them to their home positions. Also a set of switch springs S675 is associated with the wipers noted, that is actuated when they are moved away from their home positions.

The voice current repeaters 221, 222, etc., incorporated in the trunk lines 220, etc., extending between the remote exchange 10 and the central office 20, as well as the voice current repeaters 513, 613, etc., incorporated in the trunk lines 515, etc., extending between the central office 20 and the distant exchange 30, are of the conventional vacuum tube automatic gain control type. The way stations W1 and W2 connected to the trunk 515 extending between the central office 20 and the distant exchange 30 are of the local battery type and are provided with conventional magneto type telephone equipment.

The trunk circuits 245, etc., respectively individually associated with the repeaters 240, etc., terminating the trunk lines 220, etc., extending between the remote exchange 10 and the central office 20 are identical and of any suitable type; while the trunk circuits 920, etc., respectively individually associated with the repeaters 300, etc., terminating the trunk lines 515, etc., extending between the central office 20 and the distant exchange 30 are identical. Specifically, the trunk circuit 920 individually associated with the repeater 300 is illustrated in Fig. 9 and comprises a relay group including two sleeve relays R930 and R940 and a cut-off relay R950. Also the trunk circuit 920 comprises a drop D902, a busy lamp L911, a regular trunk jack J910 and a way station jack J903. The regular trunk jack J910 is utilized by the operator at the switchboard 900 to seize the repeater 300 when a call is to be extended to a subscriber substation in the distant exchange 30; while the way station jack J903 is utilized by the operator at the switchboard 900 to seize the repeater 300 when a call is to be extended to one of the way stations W1 or W2 or when a call is to be answered from one of the way stations W1 or W2. Thus the regular trunk jack J910 is a one-way outgoing jack; while the way station jack J903 is a two-way outgoing and incoming jack.

In passing, it is noted that each of the trunk circuits 245, etc., associated with the repeaters 240, etc., comprises a regular trunk jack, not shown, accessible to the operator at the switchboard 900, which is utilized to seize the associated repeater 240, etc., when a call is to be extended to a subscriber substation in the remote exchange 10.

Finally, the switchboard 900 comprises a plurality of cord circuits; a fragmentary portion of the cord circuit 960 being illustrated in Fig. 9 as comprising a plug P961, a talk key K961, a dial key K962 and a ring key K963, as well as a headset 963 and an impulse transmitting mechanism in the form of a dial 964.

The tone units 211, etc., in the remote exchange 10, the tone units 241, 501, etc., in the central office 20, and the tone units 601, etc., in the distant exchange 30 are identical; each being of the type disclosed in the co-pending application of Otho D. Grandstaff, Serial No. 738,194 filed March 29, 1947. For example, the tone unit 501 indicated in Fig. 5 comprises both a sender and a receiver of unmodulated audio frequency signals and fixed frequency modulated audio frequency carrier signals. Specifically, the tone unit 501 is adapted to send and to receive unmodulated 1000 cycle audio frequency signals as well as to send and to receive 60 cycle modulated 1000 cycle audio frequency carrier signals; which signals are utilized for the purpose of digit control, seizure control, supervisory control and release control as explained more fully hereinafter. Also the tone unit 501 comprises a modulation cut-off relay, a receive switch relay, a pulse cut-in relay, an impulse-in relay and a signal-in relay; as well as a group of conductors extending to the associated repeater 300 and including a sending −conductor C501, a sending +conductor C502, a monitoring −conductor C503, a monitoring +conductor C504, a receiving −conductor C505, a receiving +conductor C506, a receiving switch conductor C507, a modulation cut-off conductor C508, a signal-in conductor C509, a dial-in conductor C510, and a pulse cut-in conductor C511. Finally, the tone unit 501 comprises a 60 cycle generator and a 1000 cycle generator as well as a vacuum tube relay circuit.

A better understanding of the connection and arrangement of the apparatus incorporated in the telephone system will be facilitated from a consideration of the extension of calls involving the various subscriber substations in the remote exchange 10, the central office 20 and the distant exchange 30, as well as the extension of calls involving the switchboard in the central office and the way stations, appearing hereinafter.

*Sect. 3.—Local calls*

In the remote exchange 10 a call may be extended from a calling subscriber substation in the first group, such for example, as the calling subscriber substation T3, via the subscriber line 201, the finder 202, the selector 203 and a local connector in the first group, not shown, to a called subscriber substation in the first group. Also in the event all of the local connectors in the first group, not shown, are busy, the call may be routed via the trunk 213 to the combination connector 204 in the first group and thence completed to the called subscriber substation in the first group. Similarly, in the central office 20, a call may be extended from a calling subscriber substation in the first group, such, for example as the calling subscriber substation T2, via the subscriber line 231, the finder 232, the selector 233, and a local connector in the first group, not shown, to a called subscriber substation in the first group. Also in the event all of the local connectors in the first group, not shown, are busy, the call may be routed via the trunk 243 to the combination connector 234 in the first group and thence completed to the called subscriber substation in the first group. Likewise, in the distant exchange 30, a call may be extended from a calling subscriber substation in the first group, such, for example, as the calling subscriber substation T1, via the subscriber line 801, the finder 802, the selector 803 and a local connector in the first group, not shown, to a called subscriber substation in the first group. Also in the event all of the local connectors in the first group, not shown, are busy, the call may be routed via the trunk 806 to the combination connector 804 in the first group and thence completed to the called subscriber substation in the first group. These operations are entirely conventional and are not described in detail in the interest of brevity.

*Sect. 4.—A call from a subscriber substation in the central office to a subscriber substation in the distant exchange.*

Now assuming that a call has been initiated at the calling subscriber substation T2 in the central office 20, that the finder 232 of the link illustrated has operated to seize the subscriber line 231 extending to the calling subscriber substation T2 and that the selector 233 of the link is conditioned to respond to the first digit dialed, the subscriber at the calling subscriber substation T2 proceeds to dial a predetermined prefix digit; whereby the selector 233 is operated to select the group of trunks, including the trunk 310, and then an idle trunk in the selected group. For example, the selector 233 may select the particular trunk 310 extending to the repeater 300, the trunk 310 being marked as idle by the application of battery potential upon the control conductor C313 thereof via the contacts 454, 444', 567, 368 and the lower winding of the out-seize relay R350. When the selector 233 seizes the trunk 310, ground potential therein is applied to the control conductor C313 of the trunk 310 in order to complete a circuit substantially identical to that traced above for energizing the lower winding of the out-seize relay R350 causing the latter relay to operate. Also a loop circuit is completed between the calling subscriber substation T2 and the upper and lower windings of the line relay R390 in the repeater 300; whereby the latter relay operates. The loop circuit mentioned extends from ground potential by way of the lower winding of the line relay R390, the contacts 434 and 446 and the winding W402 of the repeating coil RC400 to the line conductor C312; and from battery potential by way of the upper winding of the line relay R390, the contacts 432 and 444 and the winding W401 of the repeating coil RC400 to the line conductor C311; the line conductors C311 and C312 of the trunk 310 being connected together, via the selector 233, the finder 232 and the line conductors of the subscriber line 231, at the calling subscriber substation T2.

Upon operating the out-seize relay R350 completes, at the contacts 356, a path, including the contacts 567 and 368, for short-circuiting the upper winding thereof; and completes, at the contacts 354, a circuit, including the contacts 449 and the resistor 393, for operating the lock relay R380. Upon operating the line relay R390 completes, at the contacts 392, a circuit, including the contacts 405, for operating the start pulse relay R420; and completes, at the contacts 391, a point in multiple to the contacts 384', for applying ground potential via the contacts 496' to the receiving switch conductor C507 extending to the tone unit 501. Upon operating the lock relay R380 interrupts, at the contacts 384', one of the multiple paths for applying ground potential to the receiving switch conductor C507; and completes, at the contacts 381', a circuit, including the contacts 365, 467 and 561, for operating the timer relay R545. Also the lock relay R380 completes, at the contacts, 383, a path for applying ground potential to the hold conductor C301; thereby to complete a path, including the contacts 331 and the conductor C302, for illuminating the busy lamps L322 and L911 and a direct circuit for operating the cut-off relay R950. The illumination of the busy lamp L322 indicates the busy condition of the repeater 300; and the illumination of the busy lamp L911 associated with the regular trunk jack J910 at the switchboard 900 indicates the busy condition of the terminated trunk 310 extending to the repeater 300 to the operator thereat. Upon operating the cut-off relay R950 interrupts, at the contacts 951 and 952, the path, including the condenser 901, for bridging the drop D902 at the switchboard 900 across the line conductors of the trunk line 515 in order to prevent operation of the drop D902 at this time. Also the application of ground potential to the hold conductor C301 completes a circuit for energizing the left-hand winding of the answer relay R370; whereby the latter relay is conditioned to operate when the right-hand winding thereof is subsequently energized and properly poled.

Upon operating the start pulse relay R420 completes, at the contacts 422, a circuit for operating the hold relay R400; and completes, at the contacts 425, a holding circuit, including the contacts 392 and the resistor 415, for energizing the winding thereof. Upon operating the timer relay R545 completes, at the contacts 548, a circuit for energizing the winding of the timer relay R565 in order to cause the latter relay to operate shortly thereafter, it being of the slow-to-operate type. Also the timer relay R545 completes, at the contacts 549, a holding circuit, including the contacts 467 and 561, for energizing the winding thereof; completes, at the contacts 547, a circuit, including the contacts 552, for energizing the upper winding of the prepare relay R495 in order to cause the latter relay to operate, and completes, at the contacts 547, a multiple circuit, including the contacts 552, 388, 387 and 465, for operating the control relay R470; and completes, at the contacts 547 and 546, a circuit, including the contacts 552, for energizing the upper winding of the pulse relay R520 in order to cause the latter relay to operate. Upon operating the prepare relay R495 interrupts, at the contacts 496', the path for applying ground potential to the receiving switch conductor C507. Upon operating the hold relay R400 completes, at the contacts 402, a holding circuit, including the contacts 495' and 391, for energizing the winding thereof; completes, at the contacts 403, a path, including the contacts 356, 444' and 454, for applying ground potential to the control conductor C313 of the trunk 310; and completes, at the contacts 403, a multiple holding circuit, including the contacts 356, 567, and 368, for energizing the lower winding of the out-seize relay R350. Also the hold relay R400 interrupts, at the contacts 405, the original operating circuit for the start pulse relay R420; and completes, at the contacts 404, a priming circuit, including the contacts 492, the resistor 419 and the adjustable resistor 418, for energizing the winding of the pulse relay R490; and completes, at the contacts 404, a priming circuit, including the contacts 423 and the resistor 416, for energizing the winding of the pulse relay R525. Further, the hold relay R400 completes, at the contacts 401, a priming circuit, including the contacts 499 and the resistor 524, for energizing the upper winding of the pulse relay R520.

Upon operating the control relay R470 interrupts, at the contacts 471 and 473, the normal connection including the contacts 481 and 483, between the monitoring −conductor C503 and the monitoring +conductor C504 and the windings W403 and W404 of the repeating coil RC400; and completes, at the contacts 472, a path for short-circuiting the winding W403 of the repeating coil RC400. Also the control relay R470 completes, at the contacts 474, a path for short-circuiting the right-hand winding of the answer relay R370; and completes, at the contacts 475, a holding circuit, including the contacts 498, for energizing the lower winding of the prepare relay R495. Upon operating the pulse relay R520 completes, at the contacts 521, a circuit, including the resistor 525, for operating the impulse relay R535; and completes, at the contacts 522, a circuit, including the contacts 494, the resistor 416 and the contacts 423 and 404, for operating the pulse relay R490. Upon operating the impulse relay R535 interrupts, at the contacts 536, a normally completed path for shorting together the sending —conductor C501 and the sending +conductor C502; whereby the sending —conductor C501 is effectively connected via the contacts 497 to the negative line conductor of the trunk line 515 and the sending +conductor C502 is effectively connected via the condenser 537 and the resistor 538 to the positive line conductor of the trunk line 515. When the timer relay R565 operates, it completes, at the contacts 566, a circuit for energizing the winding of the timer relay R560 in order to cause the latter relay to operate shortly thereafter, it being of the combination slow-to-operate and slow-to-release type. Also the timer relay R565 interrupts, at the contacts 567, the path for short-circuiting the upper winding of the out-seize relay R350; whereby the upper and lower windings of the out-seize relay R350 are energized in series circuit relation via a holding circuit, including the contacts 403 of the operated hold relay R400. Further the timer relay R565 completes, at the contacts 566, a circuit, including the contacts 363, for energizing the lower winding of the sequence relay R360; whereby the latter relay operates through its first step completing, at the contacts 362, a path, also including the grounded hold conductor C301 for short-circuiting the upper winding thereof; whereby further operation of the sequence relay R360 is prevented at this time. When the timer relay R560 operates, it completes, at the contacts 562, a circuit for operating the control relay R540; and interrupts, at the contacts 561, the circuit for energizing the winding of the timer relay R545 in order to cause the latter relay to restore shortly thereafter, it being of the slow-to-release type. Uon operating the control relay R540 completes, at the contacts 542, a circuit for operating the control relay R530. When the timer relay R545 restores, it interrupts, at the contacts 548, the circuit for maintaining operated the timer relay R565; and interrupts, at the contacts 546 and 547, the circuit for energizing the upper winding of the pulse relay R520 in order to cause the latter relay to restore shortly thereafter, it being rendered slightly slow-to-release by virtue of the completed path, including the adjustable resistor 523, for short-circuiting the lower winding thereof. Also the timer relay R545 interrupts, at the contacts 547, the original operating circuit for energizing the upper winding of the prepare relay R495 and the multiple circuit for energizing the winding of the control relay R470 in order to cause the latter relay to restore shortly thereafter, it being of the slow-to-release type. Upon restoring the pulse relay R520 interrupts, at the contacts 521, the circuit for maintaining operated the impulse relay R535. Upon restoring the impulse relay R535 again completes, at the contacts 536, the shorting connection between the sending —conductor C501 and the sending +conductor C502; whereby the sending —conductor C501 and the sending +conductor C502 are effectively disconnected from the negative and the positive line conductors of the trunk 515. Upon restoring the timer relay R565 interrupts, at the contacts 566, the circuit for energizing the winding of the timer relay R560 in order to cause the latter relay to restore shortly thereafter, it being of the combination slow-to-operate and slow-to-release type. Also the timer relay R565 interrupts, at the contacts 566, the previously traced circuit for energizing the lower winding of the sequence relay R360 and the previously traced path for short-circuiting the upper winding thereof; whereby the sequence relay R360 operates through its second step. Also the timer relay R565 again completes, at the contacts 567, the path for short-circuiting the upper winding of the out-seize relay R350; whereby the holding circuit for energizing the lower winding of the out-seize relay R350 is recompleted.

The sequence relay R360 operates through its second step by virtue of the completed circuit for energizing in series the upper and lower windings thereof; and interrupts, at the contacts 363, the connection to the junction between the upper and lower windings thereof. Also the sequence relay R360 completes, at the contacts 361, a path for applying ground potential through the lower winding of the tandem test relay R340 to the EC conductor C314 of the trunk 310 extending back to the selector 233; whereby a test is made by the tandem test relay R340 in order to determine whether the incoming circuit includes another repeater; which circumstance does not exist in the present example since the present call originates at the calling subscriber substation T2 in the central office 20. Accordingly, the tandem test relay R340 is not operated in the present example. Also the sequence relay R360 completes, at the contacts 366, a connection including the contacts 382′ and 336, between the timer conductor C394 and the junction between the upper and lower windings of the time pulse relay R330. At this point it is noted that ground potential is applied to the timer conductors C394 and C395 intermittently, ground potential being retained upon the timer conductor C394 when applied thereto throughout a time interval of approximately one minute and ground potential being retained upon the timer conductor C395 when applied thereto throughout a timer interval of approximately five minutes; which arrangement is utilized in conjunction with the time pulse relay R330 for a purpose more fully explained hereinafter. Further the sequence relay R360 completes, at the contacts 369, a path, including the contacts 357 and 489, for applying battery potential by way of the resistor 358 to the modulation cut-off conductor C508; and completes, at the contacts 364, a holding circuit, including the contacts 381′ and the resistor 393 for energizing the winding of the lock relay R380. Upon restoring the control relay R470 interrupts, at the contacts 472, the path for short-circuiting the winding W403 of the repeating coil RC400; recompletes, at the contacts 471 and 473, the normal connection between the windings W403 and W404 of the repeating coil RC400 and the monitoring —conductor C503 and the monitoring +conductor C504. Further the control relay R470 interrupts, at the contacts 474, the path for short-circuiting the right-hand winding of the answer relay R370; and interrupts, at the contacts 475, the holding circuit for energizing the lower winding of the prepare relay R495 in order to cause the latter relay to restore. Upon restoring the prepare relay R495 recompletes, at the contacts 499, the priming circuit, including the contacts 401 and the resistor 524, for energizing the upper winding of the pulse relay R520; interrupts, at the contacts 495′, the holding circuit for energizing the winding of the hold relay R400; and recompletes, at the contacts 496′, the path for applying ground potential to the receiving switch conductor C507. Upon restoring the timer relay R560 interrupts, at the contacts 562, the circuit for energizing the winding of the control relay R540, thereby to cause the latter relay to restore shortly thereafter, it being of the slow-to-release type. Upon restoring the control relay R540 interrupts, at the contacts 542, the circuit for energizing the winding of the control relay R530 in order to cause the latter relay to restore shortly thereafter, it being of the slow-to-release type.

Considering now the operation of the tone unit 501 in conjunction with the repeater 300, when the prepare relay R495 operated to interrupt the application of ground potential to the receiving switch conductor C507, the receiving switch relay in the tone unit 501 restored; whereby the tone unit 501 was converted from a receiving condition to a sending condition. More particularly, the tone unit 501 was rendered operative to transmit 60 cycle modulated 1000 cycle current over the sending −conductor C501 and the sending +conductor C502. Accordingly, when the impulse relay R535 operated, this 60 cycle modulated 1000 cycle current was transmitted over the negative and positive line conductors of the trunk line 515. Subsequently, when the impulse relay R535 restored, the sending −conductor C501 and the sending +conductor C502 were shorted together, thereby terminating the transmission of the 60 cycle modulated 1000 cycle current over the positive and negative line conductors of the trunk line 515. Later when the prepare relay R495 restored, ground potential was again returned upon the receiving switch conductor C507; whereby the receiving switch relay in the tone unit 501 reoperated in order again to convert the tone unit 501 from the sending condition again to the receiving condition. Accordingly, it will be understod that when the selector 233 operated to seize the trunk 310 extending to the repeater 300 that the relays above described in the repeater 300 were operated through a cycle in order to cause the tone unit 501 to send a short splash of 60 cycle modulated 1000 cycle current over the trunk line 515 and constituting a seizure signal. Also at the conclusion of the sending of the splash of 60 cycle modulated 1000 cycle current, over the trunk line 515, the sequence relay R360 operated to apply resistance battery potential to the modulation cut-off conductor C508; whereby the modulation cut-off relay in the tone unit 501 was operated to cut off the 60 cycle modulation. Accordingly, at this time the tone unit 501 is conditioned to send unmodulated 1000 cycle current over the trunk line 515 under the control of the repeater 300 when ground potential is again removed from the receiving switch conductor C507 as explained more fully hereinafter.

Considering now the operation of the tone unit 601 in conjunction with the repeater 600, the seizure signal sent from the tone unit 501 by the repeater 300 over the trunk line 515 is repeated by the voice frequency repeaters 513 and 613 included therein and passes via the receiving −conductor C605 and the receiving +conductor C606 into the tone unit 601; whereby the tone unit 601 normally being in its receiving condition, responds thereto in order to bring about operation of the signal-in relay in the tone unit 601; whereupon ground potential is applied during the reception of the seizure signal to the signal-in conductor C609. The application of ground potential to the signal-in conductor C609 completes a circuit for energizing the winding of the signal-in relay R760 in the repeater 600; whereby the latter relay operates and remains operated during the reception of the seizure signal and a short time thereafter since it is of the slow-to-release type. Upon operating the signal-in relay R760 interrupts, at the contacts 762, the normal connection between the winding of the dial-in relay R710 and the dial conductor C610 extending to the tone unit 601; and completes, at the contacts 763, a circuit, including the contacts 884, 844 and 749, for operating the in-seize relay R740. Upon operating the in-seize relay R740 completes, at the contacts 747, a path for applying ground potential to the hold conductor C801; completes, at the contacts 748, a holding circuit, including the contacts 752 and the grounded hold conductor C801, for energizing the winding thereof; and interrupts, at the contacts 749, the original operating circuit for energizing the winding thereof. Also the signal-in relay R760 completes, at the contacts 763, a multiple circuit, including the contacts 788, for operating the switch-through relay R780; and completes, at the contacts 763, a multiple circuit, including the contacts 884 and 844 for energizing the upper winding of the start timer relay R650 in order to cause the latter relay to operate.

Also upon operating the in-seize relay R740 completes, at the contacts 741, a path for applying ground potential to the control conductor C818 of the trunk 815 extending to the incoming selector 805; completes, at the contacts 742 and 743, connections between the line conductors C816 and C817 of the trunk 815 and the windings W701 and W702 of the repeating coil RC700; interrupts, at the contacts 744 and 746, the normal connection between the upper and lower windings of the line relay R890 and the windings W701 and W702 of the repeating coil RC700; and completes, at the contacts 745, a loop circuit, including the left-hand winding of the answer relay R870. The loop circuit mentioned extends from the line conductor C816 of the trunk 815 by way of the contacts 711 and 742, the winding W701 of the repeating coil RC700, the contacts 745, the left-hand winding of the answer relay R870, the winding W702 of the repeating coil RC700 and the contacts 743 to the line conductor C817 of the trunk 815. When the loop circuit is thus completed, the incoming selector 805 is seized and conditioned to be responsive to a digit repeated over the trunk 815; and the left-hand winding af the answer relay R870 is energized but is not poled to operate. The application of ground potential to the hold conductor C801 completes a circuit for energizing the right-hand winding of the answer relay R870; and completes a multiple circuit, including the contacts 831, for illuminating the busy lamp L822 in order to indicate the busy condition of the repeater 600 at this time. Further the application of ground potential to the hold conductor C801 completes a multiple circuit, including the contacts 842 and 764 for operating the control relay R770. Further the in-seize relay R740 completes, at the contacts 743′, a path, including the contacts 754, for applying ground potential to the control conductor C813 of the trunk 810, thereby to mark the trunk 810 and consequently the repeater 600 as busy to the selectors 803, etc., having access thereto. Upon operating the switch-through relay R780 interrupts, at the contacts 781 and 783, the normal connections between the monitoring —conductor C603 and the monitoring +conductor C604 extending to the tone unit 601 and the windings W703 and W704 of the repeating coil RC700; completes, at the contacts 782 and 784, connections, including the contacts 771, 773 and 796, between the negative and positive line conductors of the trunk line 515 and the windings W703 and W704 of the repeating coil RC700; completes, at the contacts 787, a holding circuit, including the grounded hold conductor C801 for energizing the winding thereof; and interrupts, at the contacts 788, the original operating circuit therefor. Upon operating the control relay R770 interrupts, at the contacts 771 and 773, the previously traced connections between the negative and positive line conductors of the trunk line 515 and the windings W703 and W704 of the repeating coil RC700; completes, at the contacts 772, a path for short-circuiting the winding W703 of the repeating coil RC700; and completes, at the contacts 774, a path for short-circuiting the left-hand winding of the answer relay R870.

Upon operating the start timer relay R650 completes, at the contacts 655, a circuit, including the contacts 661, for operating the timer relay R645. Upon operating the timer relay R645 completes, at the contacts 648, a circuit for energizing the winding of the timer relay R665 in order to cause the latter relay to operate shortly thereafter, it being of the slow-to-operate type. Also the timer relay R645 completes, at the contacts 647, a holding circuit, including the contacts 653, for energizing the lower winding of the start timer relay R650. When the timer relay R665 operates, it completes, at the contacts 666, a circuit for energizing the winding of the timer relay R660; whereby the latter relay operates shortly thereafter, it being of the combination slow-to-operate and slow-to-release type. Also the timer relay R665 completes, at the contacts 666, a multiple circuit including the contacts 863 for energizing the lower winding of the sequence relay R860; whereby the latter relay operates through its first step to complete, at the contacts 862, a substantially identical path, including the grounded hold conductor C801 for short-circuiting the upper winding thereof, thereby positively to prevent operation of the sequence relay R860 through its second step at this time. When the timer relay R660 operates, it completes, at the contacts 662, a circuit for operating the control relay R640 and a multiple circuit, also including the contacts 654, for operating the rotary magnet M673 of the timer switch TS670. When the rotary magnet M673 of the timer switch TS670 is thus operated, the wipers 671 and 672 thereof are driven away from their normal rotary positions one step in the rotary direction; whereby the set of switch springs S675 is closed in order to prepare a circuit traced hereinafter for operating the release magnet M674 of the timer switch TS670. Further the timer relay R660 interrupts, at the contacts 661, the circuit for energizing the winding of the timer relay R645 in order to cause the latter relay to restore shortly thereafter, it being of the slow-to-release type. Upon restoring the timer relay R645 interrupts, at the contacts 648, the circuit for maintaining operated the timer relay R665. Upon operating the control relay R640 completes, at the contacts 642, a circuit for operating the control relay R630. Upon restoring the timer relay R665 interrupts, at the contacts 666, the circuit for energizing the winding of the timer relay R660 in order to cause the latter relay to restore shortly thereafter, it being of the combination slow-to-operate and slow-to-release type. Also the timer relay R665 interrupts, at the contacts 666, the previously mentioned path for short-circuiting the upper winding of the sequence relay R860, whereby a circuit is completed, including the grounded hold conductor C801 and the contacts 862, for energizing in series the upper and lower windings of the sequence relay R860 in order to cause the latter relay to operate through its second step.

At the conclusion of the seizure signal, the signal-in relay in the tone unit 601 restores to interrupt the application of ground potential to the signal conductor C609; whereby the signal-in relay R760 restores shortly thereafter, it being of the slow-to-release type. Upon restoring the signal-in relay R760 completes, at the contacts 762, the connection between the winding of the dial-in relay R710 and the dial conductor C610 extending to the tone unit 601; and interrupts, at the contacts 763, the circuit for energizing the upper winding of the start timer relay R650 in order to cause the latter relay to restore. Also the signal-in relay R760 interrupts, at the contacts 764, the circuit for energizing the winding of the control relay R770 in order to cause the latter relay to restore shortly thereafter, it being of the slow-to-release type; and completes, at the contacts 766, a path, including the contacts 828, 846, 877 and 741′, for applying ground potential to the pulse out-in conductor C611. The application of ground potential to the pulse cut-in conductor C611 brings about operation of the pulse cut-in relay in the tone unit 601 in order to condition the impulse-in relay therein for operation as explained more fully hereinafter. Upon restoring the timer start relay R650 interrupts, at the contacts 654, the circuit for operating the rotary magnet M673 of the timer switch TS670. When the sequence relay R860 operates through its second step, it completes, at the contacts 861, a path for applying ground potential through the lower winding of the tandem test relay R840 to the EC conductor C814 of the trunk 810, which operation has no function in the present example since the call is being routed through the repeater 600 over the trunk 815 to the incoming selector 805. Further, the sequence relay R860 completes, at the contacts 866, a connection, including the contacts 883′ and 836 between the timer conductor C895 and the junction between the upper and lower windings of the time pulse relay R830. At this point, it is noted that ground potential is applied to the timer conductors C894 and C895 intermittently, ground potential being retained upon the timer conductor C894 when applied thereto throughout a time interval of approximately one minute and ground potential being retained upon the timer conductor C895 when applied thereto throughout a time interval of approximately five minutes; which arrangement is utilized in conjunction with the time impulse relay R830 for a purpose more fully explained hereinafter. When the timer relay R660 restores, it interrupts, at the contacts 662, the circuit for energizing the winding of the control relay R640 in order to cause the latter relay to restore shortly thereafter, it being of the slow-to-release type. At this time the repeater 600 has been seized over the trunk line 515 by the repeater 300 and has, in turn, seized the incoming selector 805 over the trunk 815.

The subscriber at the calling subscriber substation T2 having dialed the prefix digit previously mentioned, proceeds to dial the three digits comprising the directory number of the called subscriber substation T1. Specifically, the line relay R390 in the repeater 300 follows the impulses of the second digit dialed at the calling subscriber substation T2 and transmitted over the trunk 310. The first time the line relay R390 restores, it interrupts, at the contacts 392, the holding circuit for maintaining operated the start pulse relay R420; and interrupts, at the contacts 391, the path for applying ground potential to the receiving switch conductor C507 extending to the tone unit 501. Upon restoring the start pulse relay R420 completes, at the contacts 424, a circuit, including the contacts 404 and 494, for operating the pulse relay R525; completes, at the contacts 421, a circuit, including the contacts 352, 387 and 465, for operating the control relay R470; and completes, at the contacts 421, a multiple circuit, including the contacts 352 and 388, for energizing the upper winding of the prepare relay R495 in order to cause the latter relay to operate. Also the start pulse relay R420 interrupts, at the contacts 422, the circuit for energizing the winding of the hold relay R400; however, the latter relay does not immediately restore as it is of the slow-to-release type. Upon operating the prepare relay R495 completes, at the contacts 497, a direct connection between the sending —conductor C501 and the negative line conductor of the trunk 515; and interrupts, at the contacts 496′, a further point in the path for applying ground potential to the receiving switch conductor C507 extending to the tone unit 501. Upon operating the control relay R470 interrupts, at the contacts 471 and 473, the connections between the monitoring —conductor C503 and the monitoring +conductor C504 and the windings W403 and W404 of the repeating coil RC400; completes, at the contacts 472, the path for short-circuiting the winding W403 of the repeating coil RC400; completes, at the contacts 474, the path for short-circuiting the right-hand winding of the answer relay R370; and completes, at the contacts 475 the holding circuit for energizing the lower winding of the prepare relay R495. Upon operating the pulse relay R525 completes, at the contacts 526, the circuit for operating the impulse relay R535; and completes, at 527, the circuit for energizing the upper winding of the pulse relay R520 in order to cause the latter relay to operate. Upon operating the impulse relay R535 interrupts, at the contacts 536, the path for shorting together the sending —conductor C501 and the sending +conductor C502; whereby the sending —conductor C501 and the sending +conductor C502 are effectively connected to the negative and positive line conductors of the trunk line 515 as previously explained. Upon operating the pulse relay R520 completes, at the contacts 522, the circuit including the contacts 424 and 404, for operating the pulse relay R490; and completes, at the contacts 521, a multiple holding circuit for energizing the winding of the impulse relay R535. Upon operating the pulse relay R490 completes, at the contacts 491, the priming circuit, including the contacts 404 and the resistor 417, for energizing the winding of the start pulse relay R420; completes, at the contacts 493, a holding circuit, including the contacts 424 and 404, for energizing the windings thereof; and interrupts, at the contacts 494, the circuit for maintaining operated the pulse relay R525. Upon restoring the pulse relay R525 interrupts, at the contacts 527, the circuit for energizing the upper winding of the pulse relay R520 in order to cause the latter relay to restore shortly thereafter, it being rendered slightly slow-to-release by virtue of the completed path, including the adjustable resistor 523 for short-circuiting the lower winding thereof. Also the pulse relay R525 interrupts, at the contacts 526, the initial operating circuit for the impulse relay R535. Upon restoring the pulse relay R520 interrupts, at the contacts 521, the circuit for maintaining operated the impulse relay R535. Upon restoring the impulse relay R535 completes, at the contacts 536, the path for shorting together the sending —conductor C501 and the sending +conductor C502, thereby effectively to disconnect the sending —conductor C501 and the sending +conductor C502 from the negative and positive line conductors of the trunk line 515.

When the line relay R390 reoperates at the conclusion of the first impulse of the second digit, it recompletes, at the contacts 391, the circuit, including the contacts 495′ and 402 for energizing the winding of the hold relay R400; and recompletes, at the contacts 392, a circuit, including the contacts 494′ and 528, for reoperating the start pulse relay R420. Upon reoperating the start pulse relay R420 interrupts, at the contacts 424, the holding circuit for retaining operated the pulse relay R490; and completes, at the contacts 425, the holding circuit, including the resistor 415 and the contacts 392, for energizing the winding thereof. Also the start pulse relay R420 interrupts, at the contacts 421, the circuit for energizing the winding of the control relay R470 in order to cause the latter relay to restore shortly thereafter, it being of the slow-to-release type. Further, the start pulse relay R420 completes, at the contacts 422, the circuit for energizing the winding of the hold relay R400. Upon restoring the pulse relay R490 recompletes, at the contacts 492, the priming circuit, including the contacts 404, the resistor 419 and the adjustable resistor 418, for energizing the winding thereof.

When the line relay R390 restores on the second pulse of the first digit, it again interrupts, at the contacts 392, the circuit for retaining operated the start pulse relay R420; whereby the pulse relay R525, the pulse relay R520, the pulse relay R490 and the impulse relay R535 operate and then restore in accordance with the cycle previously explained. In a similar manner, the third and remainder of the impulses of the second digit are repeated by the line relay R390 to the impulse relay R535; whereby the impulse relay R535 opens, at the contacts 536, the path for shorting together the sending —conductor C501 and the sending +conductor C502 a plurality of times corresponding to the impulses of the second digit; i. e. the impulse relay R535 repeats the impulses of the second digit over the negative and positive line conductors of the trunk line 515. Since the hold relay R400 and the control relay R470 are of the slow-to-release type, they remain operated during the impulsing of the second digit; and at the conclusion of the second digit, the line relay R390 is retained in its operated position retaining operated the start pulse relay R420. The operated start pulse relay R420 retains interrupted, at the contacts 421, the circuit for energizing the winding of the control relay R470; whereby the latter relay restores shortly following the second digit.

Considering now the operation of the tone unit 501 at this time, the prepare relay R495 is retained in its operated position during the second digit by the operated control relay R470; whereby the operated prepare relay R495 retains interrupted, at the contacts 496', the path for applying ground potential to the receiving switch conductor C507. Also battery potential is applied via the contacts 489, 369, 357 and the resistor 358 to the modulation cut-off conductor C508 during the second digit. The absence of ground potential upon the receiving switch conductor C507 causes the receiving switch relay in the tone unit 501 to restore; whereby the tone unit 501 is converted from the receiving condition to the sending condition. The application of battery potential upon the modulation cut-off conductor C508 retains operated the modulation cut-off relay in the tone unit 501; whereby the tone unit 501 is operative to send unmodulated 1000 cycle current over the sending —conductor C501 and the sending +conductor C502. Accordingly, splashes of unmodulated 1000 cycle current appearing upon the sending —conductor C501 and the sending +conductor C502 are sent over the negative line conductor and the positive line conductor of the trunk line 515 as the contacts 536 are opened repeatedly by the impulse relay R535 following the line relay R390. Accordingly, the impulse relay R535 repeats the impulses received from the line relay R390 in the form of splashes of unmodulated 1000 cycle current over the line conductors of the trunk line 515, and constituting a digit signal.

Shortly following the second digit, the control relay R470 restores as previously noted, recompleting, at the contacts 471 and 473, the connection between the monitoring —conductor C503 and the monitoring +conductor C502 and the windings W403 and W404 of the repeating coil RC400. Also the control relay R470 interrupts, at the contacts 472, the path for short-circuiting the winding W403 of the repeating coil RC400; interrupts, at the contacts 474, the path for short-circuiting the right-hand winding of the answer relay R370; and interrupts, at the contacts 475, the holding circuit for energizing the lower winding of the prepare relay R495 in order to cause the latter relay to restore. Upon restoring the prepare relay R495 interrupts, at the contacts 495', the multiple holding circuit for energizing the winding of the hold relay R400; recompletes, at the contacts 499, the priming circuit for energizing the upper winding of the pulse relay R520; and reconnects, at the contacts 496', ground potential to the receiving switch conductor C507. When ground potential is reapplied to the receiving switch conductor C507, the receiving switch relay in the tone unit 501 reoperates; whereby the tone unit 501 is converted from its sending position to its receiving position.

The digit signal corresponding to the second digit is transmitted over the line conductors of the trunk line 515 and received via the receiving —conductor C605 and the receiving +conductor C606 by the tone unit 601; whereby the tone unit 601 responds thereto bringing about operation and restoration of the impulse-in relay therein. Specifically, the impulse-in relay in the tone unit 601 follows the digit signal connecting and then disconnecting ground potential to the dial conductor C610 that is connected via the contacts 762 through the winding of the dial-in relay R710 to battery potential; whereby the dial-in relay R710 follows the impulses of the second digit. Each time the dial-in relay R710 operates and then restores, it completes and then interrupts, at the contacts 712, a circuit, including the contacts 765, for operating the control relay R770; whereby the latter relay operates and remains operated during impulsing as it is of the slow-to-release type. Also the first time the dial-in relay R710 operates, it completes, at the contacts 712, a circuit, including the contacts 886, for energizing the upper winding of the conrtol relay R825 in order to cause the latter relay to operate. Upon operating the control relay R825 completes, at the contacts 826, a holding circuit, including the contacts 742', for energizing the lower winding thereof; and completes, at the contacts 827, a circuit, including the contacts 766 and the set of switch springs S675, for operating the release magnet M674 of the timer switch TS670. Upon operating the release magnet M674 releases the wipers 671 and 672 of the timer switch TS 670 and causes them to be returned to their normal rotary positions; whereby the set of switch springs S675 is opened to interrupt the circuit for operating the release magnet M674. Upon operating the control relay R770 interrupts, at the contacts 771 and 773, the connection between the negative and positive line conductors of the trunk line 515 and the windings W703 and W704 of the repeating coil RC700; and completes, at the contacts 772, a path for short-circuiting the winding W703 of the repeating coil RC700. Also the control relay R770 completes, at the contacts 774, a path for short-circuiting the left-hand winding of the answer relay R870. Finally, each time the dial-in relay R710 operates and then restores, it interrupts and then recompletes, at the contacts 711, a point in the previously traced loop circuit extending via the line conductors C816 and C817 of the trunk 815 to the incoming selector 805; the contacts 711 being bridged when open by the resistor 713 and the condenser 714 in order to prevent sparking thereof. Accordingly, the tone unit 601 receives the digit signal corresponding to the second digit and repeates the impulses thereof to the dial-in relay R710; whereby the latter relay repeats the impulses of the second digit, at the contacts 711, over the trunk 815 to the incoming selector 805. The selector 805 responds to the second digit selecting first the group of trunks, including the trunk 806, and then an idle trunk therein. For example, the incoming selector 805 may select the patricular trunk 806 extending to the combination connector 804; whereby the combination connector 804 is conditioned to respond to two digits transmitted over the trunk 806.

At the conclusion of the second digit, the impulse-in relay in the tone unit 601 restores removing ground potential from the dial-in conductor C610 in order to effect the restoration of the dial-in relay R710. Upon restoring the dial-in relay R710 recompletes, at the contacts 711, the loop circuit extending via the trunk 815, the incoming selector 805 and the trunk 806 to the combination connector 804; and interrupts, at the contacts 712, the circuit for energizing the winding of the control relay R770, whereby the latter relay restores shortly thereafter as it is of the slow-to-release type. Upon restoring the control relay R770 interrupts, at the contacts 772, the path for short-circuiting the winding W703 of the repeating coil RC700; and recompletes, at the contacts 771 and 773, the connection between the negative and positive line conductors of the trunk line 515 and the windings W703 and W704 of the repeating coil RC700. Further the control relay R770 interrupts, at the contacts 774, the path for short-circuiting the left-hand winding of the answer relay R870; whereby the latter winding is again inserted into the loop circuit extending via the trunk 815 to the combination connector 804.

In a similar manner, the third and fourth digits dialed at the calling subscriber substation T2 are received over the trunk 310 by the repeater 300 and repeated over the trunk line 515 to the tone unit 601 connected to the repeater 600; whereby the repeater 600 is controlled to repeat the third and fourth digits over the trunk 815 to the combination connector 804; whereby the combination connector 804 is operated in accordance therewith to select the subscriber line 801 extending to the called subscriber substation T1. The subsequent operation of the combination connector 804 depends upon the idle or busy condition of the called subscriber substation T1 at this time.

First assuming that the called subscriber substation T1 is idle at this time, the combination connector 804 operates to project ringing current over the subscriber line 801 extending thereto in order to operate the ringer thereat, indicating to the subscriber at the called subscriber substation T1 that a call is waiting to be answered. Also the combination connector 804 operates to return ring-back tone current over the trunk 806, the incoming selector 805, the line conductors C816 and C817 of the trunk 815 and the windings W701 and W702 of the repeating coil RC700; whereby a corresponding ring-back tone current is induced in the windings W703 and W704 of the repeating coil RC700 and traverses the connection including the contacts 771, 773 and 782, 784 and 796, and the line conductors of the trunk line 515 and thence via the receiving −conductor C505 and the receiving +conductor C506 into the tone unit 501. The ring-back tone current received over the receiving −conductor C505 and the receiving +conductor C506 by the tone unit 501 is amplified therein and impressed upon the monitoring −conductor C503 and the monitoring +conductor C504; whereby it traverses the connection, including the contacts 481, 483 and 471, 473 and the windings W403 and W404 of the repeating coil RC400; whereby a corresponding ring-back tone current is induced in the windings W401 and W402 of the repeating coil RC400 and returned over the line conductors C311 and C312 of the trunk 310 and consequently the selector 233, the finder 232 and the subscriber line 231 to the calling subscriber substation T2. Accordingly, the ring-back tone current returned from the combination connector 804 in the distant exchange 30 is received by the tone unit 501 in the central office 20 and amplified and returned over the loop extending to the calling subscriber substation T2 in the central office 20.

When the subscriber at the called subscriber substation T1 answers the call, the combination connector 804 operates to reverse the polarity over the loop circuit extending back to the left-hand winding of the answer relay R870; whereby the latter relay is poled to operate; and to interrupt the return of ring-back tone current over the connection. Upon operating the answer relay R870 completes, at the contacts 871, a circuit, including the contacts 631, 785 and 761, and the grounded hold conductor C801, for operating the reverse battery relay R730; and completes, at the contacts 871, a multiple circuit, including the contacts 641, 881 and 875, for energizing the upper winding of the answer supervisory relay R875 in order to cause the latter relay to operate; and completes, at the contacts 872, a circuit, including the contacts 879, 767 and 661, for operating the timer relay R645. Upon operating the reverse battery relay R730 interrupts, at the contacts 736, a further point in a holding circuit traced hereinafter for energizing in series the upper and lower windings of the time pulse relay R830; and interrupts, at the contacts 731, the normal connection between the sending −conductor C601 extending to the tone unit 601 and the receiving −conductor C605 extending to the tone unit 601 and consequently the negative line conductor of the trunk line 515. The answer supervisory relay R875 operates only through its first step to complete, at the contacts 876, a path substantially identical to that previously traced for short-circuiting the lower winding thereof in order positively to prevent the latter relay from operating through its second step at this time. Upon operating the timer relay R645 completes, at the contacts 648, a circuit for energizing the winding of the timer relay R665, thereby to cause the latter relay to operate shortly thereafter, it being of the slow-to-operate type. Also the timer relay R645 completes, at the contacts 649, a holding circuit, including the contacts 767 and 661, for energizing the winding thereof; and completes, at the contacts 647, a circuit, including the contacts 652, for energizing the upper winding of the prepare relay R795 in order to cause the latter relay to operate. Further, the timer relay R645 completes, at the contacts 647 and 646, a multiple circuit, including the contacts 652, for energizing the upper winding of the pulse relay R620 in order to cause the latter relay to operate. When the pulse relay R620 operates, it completes, at the contacts 621, a circuit for operating the impulse relay R635. Upon operating the impulse relay R635 interrupts, at the contacts 636, the normal path for shorting together the sending −conductor C601 and the sending +conductor C602. Upon operating the prepare relay R795 interrupts, at the contacts 796, the connection between the negative line conductor of the trunk line 515 and the winding W703 of the repeating coil RC700; and completes, at the contacts 797, a connection between the sending −conductor C601 and the negative line conductor of the trunk line 515. Also at this time, the sending +conductor C602 is connected by way of the condenser 637 and the resistor 638 to the positive line conductor of the trunk line 515. Further, the prepare relay R795 interrupts, at the contacts 796′, the path for applying ground potential to the receiving switch conductor C607 extending to the tone unit 601. When ground potential is thus removed from the receiving switch conductor C607, the receiving switch relay in the tone unit 601 restores converting the tone unit 601 from its receiving position to its sending position; whereby the tone unit 601 operates at this time, to transmit 60 cycle modulated 1000 cycle current over the sending −conductor C601 and the sending +conductor C602 which are connected at this time to the negative and the positive line conductors of the trunk line 515.

When the timer relay R665 operates it completes, at the contacts 666, a circuit for energizing the winding of the timer relay R660 in order to cause the latter relay to operate shortly thereafter, it being of the combination slow-to-operate and slow-to-release type. Upon operating the timer relay R660 completes, at the contacts 662, a circuit for operating the control relay R640; and interrupts, at the contacts 661, the circuit for energizing the winding of the timer relay R645 in order to cause the latter relay to restore shortly thereafter, it being of the slow-to-release type. Upon operating the control relay R640 completes, at the contacts 642, a circuit for operating the control relay R630; and interrupts, at the contacts 641, the path for short-circuiting the lower winding of the answer supervisory relay R875. Accordingly, at this time, the upper and lower windings of the answer supervisory relay R875 are energized in series circuit relation causing the latter relay to operate through its second step. When the timer relay R645 restores, it interrupts, at the contacts 648, the circuit for retaining operated the timer relay R665; interrupts, at the contacts 647 and 646, the circuit for energizing the upper winding of the pulse relay R620 in order to cause the latter relay to restore shortly thereafter, it being rendered slightly slow-to-release by virtue of the normally completed path, including the adjustable resistor 623 for short-circuiting the lower winding thereof; and interrupts, at the contacts 647, the circuit for energizing the upper winding of the prepare relay R795 in order to cause the latter relay to restore. Upon restoring the pulse relay R620 interrupts, at the contacts 621, the circuit for maintaining operated the impulse relay R635. Upon restoring the impulse relay R635 again completes, at the contacts 636, the path for shorting together the sending −conductor C601 and the sending +conductor C602, thereby to terminate the splash of 60 cycle modulated 1000 cycle current returned over the trunk line 515. Upon restoring the prepare relay R795 interrupts, at the contacts 797, the connection between the sending −conductor C601 and the negative line conductors of the trunk line 515; and, recompletes, at the contacts 796, the connection between the negative and positive line conductors of the trunk line 515 and the windings W703 and W704 of the repeating coil RC700. Also the prepare relay R795 recompletes, at the contacts 796′, the path for applying ground potential to the receiving switch conductor C607 in order to bring about reoperation of the receiving switch relay in the tone unit 601; whereby the tone unit 601 is converted from its sending position to its receiving position.

When the answer supervisory relay R875 operates through its second step, it interrupts, at the contacts 879, a further point in the previously traced circuit for operating the timer relay R645; and prepares, at the contacts 878, an alternative circuit traced hereinafter for operating the timer relay R645. Also the answer supervisory relay R875 interrupts, at the contacts 877, the previously traced path for applying ground potential to the pulse cut-in conductor C611 extending to the tone unit 601 in order to bring about restoration of the pulse cut-in relay in the tone unit 601; whereby the impulse-in relay therein is disabled positively preventing the transmission of additional digits over the dial conductor C610 to the winding of the dial-in relay R710. Upon operating the control relay R630 interrupts, at the contacts 631, the circuit for maintaining operated the reverse battery relay R730. Upon restoring the timer relay R665 interrupts, at the contacts 666, the circuit for energizing the winding of the timer relay R660 in order to cause the latter relay to restore shortly thereafter, it being of the combination slow-to-operate and slow-to-release type. Upon restoring the timer relay R660 interrupts, at the contacts 662, the circuit for energizing the winding of the control relay R640 in order to cause the latter relay to restore shortly thereafter, it being of the slow-to-release type. Upon restoring the control relay R640 interrupts, at the contacts 642, the circuit for energizing the winding of the control relay R630 in order to cause the latter relay to restore shortly thereafter, it being of the slow-to-release type. Upon restoring the control relay R630 recompletes, at the contacts 631, the circuit for operating the reverse battery relay R730. Accordingly, when the subscriber at the called subscriber substation T1 answered the call, the answer relay R870 in the repeater 600 was operated; whereby the repeater 600 in conjunction with the tone unit 601 operated to transmit a splash of 60 cycle modulated 1000 cycle current over the trunk 515 and constituting an answer signal.

The answer signal transmitted over the trunk line 515 is received via the receiving −conductor C505 and the receiving +conductor C506 by the tone unit 501; whereby the signal-in relay in the tone unit 501 is operated and then restored in order to cause ground potential to be applied to the signal conductor C509 and then removed therefrom; whereupon the signal-in relay R460 in the repeater 300 operates and restores shortly thereafter since it is of the slow-to-release type. When the signal-in relay R460 operates, it interrupts, at the contacts 462, the connection between the dial-in conductor C510 extending to the tone unit 501 and the winding of the dial-in relay R410; and completes, at the contacts 463, a circuit, including the contacts 488, for operating the switch-through relay R480. Also the signal-in relay R460 completes, at the contacts 464, a circuit, including the contacts 342 and the grounded hold conductor C301, for operating the control relay R470. Upon operating the switch-through relay R480 interrupts, at the contacts 481 and 483, the connection between the windings W403 and W404 of the repeating coil RC400 and the monitoring −conductor C503 and the monitoring +conductor C504; and completes, at the contacts 482 and 484, connections, including the contacts 471, 473 and 496 between the negative and positive line conductors of the trunk line 515 and the windings W403 and W404 of the repeating coil RC400. Further, the switch-through relay R480 interrupts, at the contacts 489, the path for applying resistance battery potential to the modulation cut-off conductor C508, thereby to cause the modulation cut-off relay in the tone unit 501 to restore rendering the tone unit 501 subsequently operative to send 60 cycle modulated 1000 cycle current over the sending −conductor C501 and the sending +conductor C502. Also the switch-through relay R480 completes, at the contacts 487, a holding circuit, including the grounded hold conductor C301, for energizing the winding thereof; interrupts, at the contacts 488, the original operating circuit therefor; and completes, at the contacts 486, a circuit, including the contacts 345, 385 and 463, for energizing the winding of the timer relay R560 in order to cause the latter relay to operate shortly thereafter, it being of the combination slow-to-operate and slow-to-release type. When the signal-in relay R460 then restores, it reconnects, at the contacts 462, the dial-in conductor C510 to the winding of the dial-in relay R410; and interrupts, at the contacts 463, the circuit for energizing the winding of the timer relay R560 in order to cause the latter relay to restore shortly thereafter, it being of the combination slow-to-operate and slow-to-release type. Also the signal-in relay R460 interrupts, at the contacts 464, the circuit for energizing the winding of the control relay R470 in order to cause the latter relay to restore shortly thereafter, it being of the slow-to-release type. Finally, the signal-in relay R460 completes, at the contacts 461, a circuit, including the contacts 485, 531, 541 and 382, and the grounded hold conductor C301, for operating the reverse battery relay R430. Upon operating the reverse battery relay R430 interrupts, at the contacts 431, the normal connection between the sending −conductor C501 and the receiving −conductor C505 and consequently the negative line conductor of the trunk line 515. Also the reverse battery relay R430 reverses, at the contacts 432, 433, 434 and 435, the polarity of the line conductors C311 and C312 of the trunk 310, with respect to the line relay R390, which reversal of polarity over the loop circuit extending back to the calling subscriber substation T2 may be employed in the line circuit, not shown, associated with the subscriber line 231, extending to the calling subscriber substation T2, for the purpose of assessing a charge against the calling subscriber substation T2 in accordance with conventional practice. Further, the reverse battery relay R430 interrupts, at the contacts 436, a further point in a holding circuit traced hereinafter for energizing in series the upper and lower windings of the time pulse relay R330 for a purpose explained subsequently. At this time an established connection is completed between the calling subscriber substation T2 in the central office 20 and the called subscriber substation T1 in the distant exchange 30 including the subscriber line 231, the finder 232, the selector 233, the trunk 310, the repeater 300, the trunk line 515, the repeater 600, the trunk 815, the incoming selector 805, the trunk 806, the combination connector 804 and the subscriber line 801.

Reconsidering the extension of the connection from the calling subscriber substation T2 in the central office 20 to the called subscriber substation T1 in the distant exchange 30, when the combination connector 804 operates to select the subscriber line 801 extending to the called subscriber substation T1, it may test it as busy; whereby the combination connector 804 operates to return busy tone current over the trunk 806, the incoming selector 805 and the line conductors C816 and C817 of the trunk 815 to the repeater 600. This busy tone current is repeated by the repeating coil RC700 over the trunk line 515 and received by the tone unit 501 over the receiving −conductor C505 and the receiving +conductor C506. The tone unit 501 operates to amplify the received busy tone current and to project it over the monitoring −conductor C503 and the monitoring +conductor C504; whereby the repeating coil RC400 repeats the busy tone current over the line conductors C311 and C312 of the trunk 310 and consequently over the selector 233, the finder 232 and the subscriber line 231 to the calling subscriber substation T2 in order to indicate the condition noted to the subscriber thereat.

Upon receiving busy tone, the subscriber at the calling subscriber substation T2 releases, interrupting the loop circuit extending to the line relay R390 in the repeater 300; whereby the latter relay restores. Upon restoring the line relay R390 interrupts, at the contacts 392, the circuit for maintaining operated the start pulse relay R420. Also the line relay R390 interrupts, at the contacts 391, the path for applying ground potential to the receiving switch conductor C507 in order to effect the restoration of the receiving switch relay in the tone unit 501; whereupon the tone unit 501 is converted from its receiving position to its sending position. Upon restoring the start pulse relay R420 completes, at the contacts 424, the circuit for operating the pulse relay R525; and completes, at the contacts 421, the circuit for energizing the upper winding of the prepare relay R495 in order to cause the latter relay to operate. Also the start pulse relay R420 completes, at the contacts 421, the multiple circuit for operating the control relay R470; and interrupts, at the contacts 422, the circuit for energizing the winding of the hold relay R400 in order to cause the latter relay to restore shortly thereafter, it being of the slow-to-release type. Upon operating the pulse relay R525 completes, at the contacts 527, the circuit for energizing the upper winding of the pulse relay R520 in order to cause the latter relay to operate; and completes, at the contacts 526, the circuit for operating the impulse relay R535. Upon operating the impulse relay R535 interrupts, at the contacts 536, the path for shorting together, the sending −conductor C501 and the sending +conductor C502. Upon operating the control relay R470 completes, at the contacts 475, the holding circuit for energizing the lower winding of the prepare relay R495. Upon operating the pulse relay R520 completes, at the contacts 521, the holding circuit for retaining operated the impulse relay R535; and completes, at the contacts 522, the circuit for operating the pulse relay R490. Upon operating the pulse relay R490 completes, at the contacts 493, the holding circuit for energizing the winding thereof; and interrupts, at the contacts 494, the circuit for retaining operated the pulse relay R525. Upon restoring the pulse relay R525 interrupts, at the contacts 527, the circuit for energizing the upper winding of the pulse relay R520 in order to cause the latter relay to restore; and interrupts, at the contacts 526, the initial circuit for operating the impulse relay R535. Upon restoring the pulse relay R520 interrupts, at the contacts 521, the circuit for retaining operated the impulse relay R535. Upon restoring the impulse relay R535 again completes, at the contacts 536, the path for shorting together the sending −conductor C501 and the sending +conductor C502.

Upon restoring the hold relay R400 interrupts, at the contacts 403, the holding circuit for energizing in series the upper and lower windings of the out-seize relay R350 in order to cause the latter relay to restore; and interrupts, at the contacts 403, the multiple path for applying ground potential to the control conductor C313 of the trunk 310, thereby to effect the release of the selector 233 and the finder 232; whereupon the line circuit, not shown, associated with the subscriber line 231 operates to mark the subscriber substation T2 as idle to the connectors having access thereto. Also the hold relay R400 interrupts, at the contacts 404, the holding circuit for retaining operated the pulse relay R490. Upon restoring, the out-seize relay R350 completes, at the contacts 355, an alternative path, including the contacts 367, 444′ and 454, for applying ground potential to the control conductor C313 of the trunk 310, thereby again to mark the trunk 310 as busy to the selectors having access thereto. Also the out-seize relay R350 completes, at the contacts 351, a holding circuit, including the contacts 387 and 465 for energizing the winding of the control relay R470; and completes, at the contacts 351, a multiple holding circuit, including the contacts 388, for energizing the upper winding of the prepare relay R495. Further the out-seize relay R350 interrupts, at the contacts 357, the path for applying battery potential to the modulation cut-off conductor C508 in order to bring about the restoration of the modulation cut-off relay in the tone unit 501; whereby the tone unit 501 is conditioned to send 60 cycle modulated 1000 cycle current over the sending —conductor C501 and the sending +conductor C502 at this time. Further the out-seize relay R350 completes, at the contacts 353, a circuit, including the contacts 440 and 380, for energizing the lower winding of the start timer relay R550 in order to cause the latter relay to operate. Upon operating the start timer relay R550 completes, at the contacts 555, a circuit, including the contacts 561, for operating the timer relay R545; and completes, at the contacts 551 a circuit, including the contacts 388, 352 and 421, for energizing the upper winding of the pulse relay R520 in order to cause the latter relay to operate. Upon operating the timer relay R545 completes, at the contacts 548, a circuit for energizing the winding of the timer relay R565 in order to cause the latter relay to operate shortly thereafter, it being of the slow-to-operate type. Also the timer relay R545 completes at the contacts 549, a holding circuit, including the contacts 467 and 561, for energizing the winding thereof; and completes, at the contacts 547, a holding circuit, including the contacts 553, for energizing the lower winding of the timer start relay R550. Upon operating the pulse relay R520 completes, at the contacts 521, the circuit for operating the impulse relay R535. Upon operating the impulse relay R535 interrupts, at the contacts 536, the path for shorting together the sending —conductor C501 and the sending +conductor C502. When the timer relay R565 operates, it completes, at the contacts 566, a circuit for energizing the winding of the timer relay R560 in order to cause the latter relay to operate shortly thereafter, it being of the combination slow-to-operate and slow-to-release type. Upon operating the timer relay R560 completes, at the contacts 562, a circuit for operating the control relay R540 and a multiple circuit also including the contacts 554 for operating the rotary magnet M573 of the timer switch TS570. Further, the timer relay R560 interrupts, at the contacts 561, the circuit for energizing the winding of the timer relay R545 in order to cause the latter relay to restore shortly thereafter, it being of the slow-to-release type. Upon operating the control relay R540 completes, at the contacts 542, the circuit for operating the control relay R530. Upon restoring the timer relay R545 interrupts, at the contacts 548, the circuit for retaining operated the timer relay R565; and interrupts, at the contacts 547, the multiple holding circuit for energizing the lower winding of the timer start relay R550. Upon restoring the timer relay R565 interrupts, at the contacts 566, the circuit for energizing the winding of the timer relay R560 in order to cause the latter relay to restore shortly thereafter, it being of the combination slow-to-operate and slow-to-release type. Upon restoring the timer relay R560 interrupts, at the contacts 562, the circuit for energizing the winding of the control relay R540 in order to cause the latter relay to restore shortly thereafter, it being of the slow-to-release type. Also the timer relay R560 interrupts, at the contacts 562, the multiple circuit for maintaining operated the rotary magnet M573 of the timer switch TS570; and recompletes, at the contacts 561, the circuit, including the contacts 555 for reoperating the timer relay R545. When the rotary magnet M573 of the timer switch TS570 is thus operated, the wipers 571 and 572 thereof are driven one step in the rotary direction away from their normal rotary positions; whereby the set of switch springs S575 are closed to prepare a circuit traced hereinafter for operating the release magnet M574 of the timer switch TS570.

The timer relays R545, R565 and R560 operate through the above described cycle repeatedly; whereby the rotary magnet M573 is operated repeatedly in order to drive the wipers 571 and 572 of the timer switch TS570 step by step in the rotary direction. Also the control relays R540 and R530 follow the above described cycle but perform no useful function at this time. When the wipers 571 and 572 of the timer switch TS570 are driven into engagement with the eighth contacts in the associated contact banks, a path, including the contacts 440, 353, 380, 364 and 381′, is completed for short-circuiting the winding of the lock relay R380 in order to cause the latter relay to restore. Upon restoring the lock relay R380 interrupts, at the contacts 388, the original operating circuit for energizing the upper winding of the prepare relay R495 and the multiple circuit for energizing the upper winding of the pulse relay R520 in order to cause the latter relay to restore. Also the lock relay R380 interrupts, at the contacts 380, the circuit for energizing the lower winding of the start timer relay R550 in order to cause the latter relay to restore; and interrupts, at the contacts 387, the circuit for energizing the winding of the control relay R470 in order to cause the latter relay to restore shortly thereafter, it being of the slow-to-release type. Further the lock relay R380 completes, at the contacts 389, a circuit, including the contacts 440, 353 and 334 and the set of switch springs S575 for operating the release magnet M574 of the timer switch TS570; whereby the wipers 571 and 572 are released and returned to their normal rotary positions opening the set of switch springs S575 in order to effect the restoration of the release magnet M574. Further the lock relay R380 interupts, at the contacts 383, the path for applying ground potential to the hold conductor C301, thereby to extinguish the busy lamp L322 and the busy lamp L911 associated with the regular trunk jack J910 at the switchboard 900 in order to indicate that the repeater 300 and consequently the trunk line 515 is idle at this time. Also when ground potential is removed from the hold conductor C301, the cut-off relay R950 in the trunk circuit 920 restores in order to reconnect, at the contacts 951 and 952, the drop D902 across the line conductors of the trunk line 515. Further, when ground potential is removed from the hold conductor C301, the left-hand winding of the answer relay R370 is deenergized and the holding circuit for energizing in series the upper and lower windings of the sequence relay R360 is interrupted in order to cause the latter relay to restore.

When the pulse relay R520 restores, it interrupts, at the contacts 521, the circuit for retaining operated the impulse relay R535; whereby the latter relay upon restoring recompletes, at the contacts 536, the path for shorting together the sending —conductor C501 and the sending +conductor C502. When the start timer relay R550 restores, it effects the restoration of the timer relay R545, the timer relay R565, the timer relay R560, the control relay R540, and the control relay R530; all in the manner previously explained. When the sequence relay R360 restores, it interrupts, at the contacts 367, the alternative path for applying ground potential to the control conductor C313 of the trunk 310; whereby the previously traced path for applying battery potential by way of the lower winding of the outseize relay R350 to the control conductor C313 is recompleted, causing the trunk 310 and consequently the repeater 300 to be marked as idle to the selectors having access thereto. When the control relay R470 restores, it interrupts, at the contacts 475, the holding circuit for energizing the lower winding of the prepare relay R495 in order to cause the latter relay to restore. Upon restoring the prepare relay R495 recompletes, at the contacts 496', the path for applying ground potential to the receiving switch conductor C507 in order to bring about reoperation of the receiving switch relay in the tone unit 501; whereby the tone unit 501 is again converted from its sending position to its receiving position. As a consequence of the operation of the timer switch TS570, incident to the release of the repeater 300, the impulse relay R535 is retained in its operated position throughout a considerable time interval; whereby the tone unit 501 sends a long splash of 60 cycle modulated 1000 cycle current over the trunk line 515 and constituting a release signal.

The release signal sent over the trunk line 515 is received via the receiving —conductor C605 and the receiving +conductor C606 by the tone unit 601; whereby the signal-in relay in the tone unit 601 operates to apply ground potential to the signal-in conductor C609 in order to bring about operation of the signal-in relay R760 in the repeater 600. Upon operating the signal-in relay R760 completes, at the contacts 763, a circuit, including the contacts 884 and 844, for energizing the upper winding of the start timer relay R650 in order to cause the latter relay to operate; and completes, at the contacts 764, a circuit, including the contacts 842 and the grounded hold conductor C801, for operating the control relay R770. Upon operating the timer start relay R650 completes, at the contacts 655, a circuit, including the contacts 661, for operating the timer relay R645. Upon operating the timer relay R645 completes, at the contacts 648, a circuit for energizing the winding of the timer relay R665 in order to cause the latter relay to operate shortly thereafter, it being of the slow-to-operate type. Upon operating the timer relay R665 completes, at the contacts 666, a circuit for energizing the winding of the timer relay R660 in order to cause the latter relay to operate shortly thereafter, it being of the combination slow-to-operate and slow-to-release type. When the timer relay R660 operates, it completes, at the contacts 662, the circuit for operating the control relay R640 and a multiple circuit, including the contacts 654, for operating the rotary magnet M673 of the timer switch TS670; whereby the wipers 671 and 672 are driven one step in the rotary direction away from their normal rotary positions closing the set of switch springs S675 in order to prepare a circuit traced hereinafter for operating the release magnet M674 of the timer switch TS670. Also the timer relay R660 interrupts, at the contacts 661, the circuit for energizing the winding of the timer relay R645 in order to cause the latter relay to restore shortly thereafter, it being of the slow-to-release type. Upon restoring the timer relay R645 interrupts, at the contacts 648, the circuit for maintaining operated the timer relay R665. Upon restoring the timer relay R665 interrupts, at the contacts 666, the circuit for energizing the winding of the timer relay R660 in order to cause the latter relay to restore shortly thereafter, it being of the combination slow-to-operate and slow-to-release type. Upon restoring the timer relay R660 interrupts, at the contacts 662, the circuit for energizing the winding of the control relay R640 in order to cause the latter relay to restore shortly thereafter, it being of the slow-to-release type; and interrupts, at the contacts 662, the multiple circuit for retaining operated the rotary magnet M673. Also the timer relay R660 recompletes, at the contacts 661, the circuit for operating the timer relay R645. Accordingly, the timer relays R645, R665 and R660 operate repeatedly through a plurality of cycles above described effecting intermittent operation of the rotary magnet M673; whereby the wipers 671 and 672 of the timer switch TS670 are driven step by step in the rotary direction. When the wipers 671 and 672 engage the third contacts in the associated contact banks a circuit, including the contacts 844, 884 and 763, is completed for operating the release relay R750. Upon operating the release relay R750 completes, at the contacts 753, a holding circuit, including the contacts 844, 884 and 763, for energizing the winding thereof; completes, at the contacts 751, an alternative holding circuit, including the contacts 748, 844, 884 and 763, for energizing the winding of the inseize relay R740; and interrupts, at the contacts 752, the original holding circuit for energizing the winding of the in-seize relay R740.

At the conclusion of the release signal, the signal-in relay in the tone unit 601 restores to interrupt the application of ground potential to the signal-in conductor C609; whereby the signal-in relay R760 in the repeater 600 restores shortly thereafter, it being of the slow-to-release type. Upon restoring the signal-in relay R760 interrupts, at the contacts 763, the circuit for energizing the upper winding of the start timer relay R650 in order to cause the latter relay to restore; interrupts, at the contacts 763, the multiple holding circuit, for retaining operated the in-seize relay R740; and interrupts, at the contacts 763, the multiple holding circuit for energizing the winding of the release relay R750 in order to cause the latter relay to restore shortly thereafter, it being of the slow-to-release type. Also the signal-in relay R760 interrupts, at the contacts 764, the circuit for energizing the winding of the control relay R770 in order to cause the latter relay to restore shortly thereafter, it being of the slow-to-release type. Upon restoring the start timer relay R650 arrests further operation of the timer relays R645, R665 and R660. Upon restoring, the in-seize relay R740 interrupts, at the contacts 747, the path for applying ground potential to the hold conductor C801 in order to deenergize the right-hand winding of the answer relay R870 and to extinguish the busy lamp L822. Also the in-seize relay R740 interrupts, at the contacts 741, the path for applying ground potential to the control conductor C818 of the trunk 815 in order to bring about the release of the incoming selector 805 and the combination connector 804. Further, the in-seize relay R740 interrupts, at the contacts 742, 743 and 745, the connection between the left-hand winding of the answer relay R870 and the line conductors C816 and C817 of the trunk 815; and recompletes, at the contacts 744 and 746, the normal connection between the upper and lower windings of the line relay R890 and the line conductors C811 and C812 of the trunk 810. Further, the in-seize relay R740 interrupts, at the contacts 743′, the path for applying ground potential to the control conductor C813 of the trunk 810; and completes, at the contacts 740, a circuit, including the contacts 853, 869 and 834 and the set of switch springs S675, for operating the release magnet M674 of the timer switch TS760; whereby the wipers 671 and 672 are released and returned to their normal rotary positions. Also when ground potential is removed from the hold conductor C801, a further point in a holding circuit traced hereinafter for energizing in series the upper and lower windings of the time pulse relay R830 is interrupted; the holding circuit for energizing in series the upper and lower windings of the sequence relay R860 is interrupted in order to cause the latter relay to restore; and the holding circuit for retaining operated the switch-through relay R780 is interrupted. Further, the in-seize relay R740 interrupts, at the contacts 741′, the path for applying ground potential to the pulse cut-in conductor C611 in order to bring about the restoration of the pulse cut-in relay in the tone unit 601. When the timer switch TS670 is thus released, the set of switch springs S675 are opened to interrupt the circuit for maintaining operated the release magnet M674 of the timer switch TS670. At this time the apparatus involved in the connection thus far extended, as explained above, is completely released and available for further use.

Reconsidering the established connection between the calling subscriber substation T2 in the central office 20 and the called subscriber substation T1 in the distant exchange 30, the subscriber at the calling subscriber substation T2 may disconnect first in order to bring about the restoration of the line relay R390 in the repeater 300. At this time the start pulse relay R420 is restored and the prepare relay R495 and the control relay R470 are operated as previously explained. The pulse relay R525 operates effecting operation of the impulse relay R535 and the pulse relay R520; the pulse relay R490 is operated; the pulse relay R525 and the pulse relay R520 are restored; and then the impulse relay R535 is restored; all in the manner previously explained. The hold relay R400 restores, the pulse relay R490 restores, the out-seize relay R350 restores and the start timer relay R550 operates; all as previously explained. The pulse relay R520 operates, the impulse relay R535 operates and the timer relays R545, R565 and R560 operate as previously noted. The control relay R540 and the control relay R530 operate, as previously noted. Upon operating the control relay R540 interrupts, at the contacts 541, the circuit for maintaining operated the reverse battery relay R430. The timer relays R545, R565 and R560 restore, and the control relays R540 and R530 restore, as previously noted. Upon restoring the control relay R540 recompletes, at the contacts 541, the circuit for reoperating the reverse battery relay R430. Upon reoperating the reverse battery relay R430 interrupts, at the contacts 436, a further point in a holding circuit traced hereinafter for energizing in series the upper and lower windings of the time pulse relay R330.

The timer relays R545, R565 and R560, the control relays R540 and R530 and the reverse battery relay R430 are operated repeatedly through the above described cycles; whereby the rotary magnet M573 of the timer switch TS570 is operated repeatedly driving the wipers 571 and 572 step by step in the rotary direction; and the set of switch springs S575 is closed. When the wipers 571 and 572 engage the eighth contacts in the associated contact bank, the winding of the lock relay R380 is short-circuited in order to cause the latter relay to restore as previously explained. The impulse relay R535 is retained operated a considerable time interval; whereby a long splash of 60 cycle modulated 1000 cycle current is sent from the tone unit 501 over the trunk line 515 and constituting a release signal. Upon restoring the lock relay R380 effects the restoration of the reverse battery relay R430, the prepare relay R495, the pulse relay R520, the impulse relay R535, the start timer relay R550, the control relay R470, and the sequence relay R360; all in the manner previously explained. Also when ground potential is removed from the hold conductor C301, the holding circuit for retaining operated the switch-through relay R480 is interrupted and also the cut-off relay R950 in the trunk circuit 920 restores. Also the busy lamp L322 and the busy lamp L911 associated with the regular trunk jack J910 at the switchboard 900 are extinguished and the release magnet M574 of the timer switch TS570 is operated in order to release the wipers 571 and 572 of the timer switch TS570 and to cause them to be returned to their normal rotary positions; whereby the set of switch springs S575 is opened to interrupt the circuit for retaining operated the release magnet M574.

The release signal sent over the trunk line 515 is received by the tone unit 601; whereby the signal-in relay R760 in the repeater 600 is operated and subsequently restored in order to bring about the release of the repeater 600 in a manner substantially identical to that previously explained. However, in this case, when the control relay R770 operates, it interrupts, at the contacts 771 and 773, the connection between the line conductors of the trunk line 515 and the windings W703 and W704 of the repeating coil RC700 so that the release signal will not be transmitted over the line conductors C816 and C817 of the trunk 815 and consequently to the called subscriber substation T1. Also the control relay R770 completes, at the contacts 774, the path for short-circuiting the left-hand winding of the answer relay R870 in order to cause the latter relay to restore and interrupts, at the contacts 871, the circuit for maintaining operated the reverse battery relay R730. Subsequently, when the inseize relay R740 restores, the loop circuit extending via the line conductors C816 and C817 of the trunk 815 is interrupted and ground potential, at the contacts 741, is removed from the control conductor C818 of the trunk 815; whereby the incoming selector 805 and the combination connector 804 are released. At this time the line circuit, not shown, associated with the subscriber line 801 extending to the called subscriber substation T1 operates to lock out of service the subscriber line 801 in the event the subscriber at the called subscriber substation T1 has not at this time released. The remainder of the release of the repeater 600 is the same as previously described. At this time the established connection between the calling subscriber substation T2 in the central office 20 and the called subscriber substation T1 in the distant exchange 30 is released and all of the apparatus involved therein is completely released and available for further use.

Reconsidering the established connection between the calling subscriber substation T2 in the central office 20 and the called subscriber substation T1 in the distant exchange 30, the subscriber at the called subscriber substation T1 may disconnect first in order to cause the combination connector 804 to reverse the polarity of the trunk 806 and consequently the line conductors C816 and C817 of the trunk 815; whereby the left-hand winding of the answer relay R870 in the repeater 600 is poled to restore. Upon restoring the answer relay R870 interrupts, at the contacts 871, the circuit for maintaining operated the reverse battery relay R730; and completes, at the contacts 873, a circuit, including the contacts 878, 767, and 661, for operating the timer relay R645. Upon restoring the reverse battery relay R730 completes, at the contacts 731, the connection between the sending —conductor C601 and the receiving —conductor C605 and consequently, the negative line conductor of the trunk line 515. The timer relays R645 and R665 operate and the prepare relay R795 operates as previously explained. Upon operating, the prepare relay R795 interrupts, at the contacts 796′, the path for applying ground potential to the receiving switch conductor C607; whereby the receiving switch relay in the tone unit 601 restores converting the tone unit 601 from its receiving position to its sending position. Also the pulse relay R620, the impulse relay R635, the timer relay R660 and the control relays R640 and R630 operate as previously explained. The timer relay R645 restores, the prepare relay R695 restores, the pulse relay R620 and the impulse relay R635 restore as previously explained. This cycle of the timer relays R645, R665 and R660, the control relays R640 and R630, the prepare relay R795, the impulse relay R635 and the pulse relay R620 is repeated. Accordingly, the impulse relay R635 operates and restores in order to cause successive short splashes of 60 cycle modulated 1000 cycle current to be returned over the trunk line 515 and constituting a disconnect signal.

The disconnect signal transmitted over the trunk line 515 is received by the tone unit 501 in order to cause the signal-in relay therein to operate and restore, thereby repeating corresponding ground impulses over the signal-in conductor C509; whereupon the signal-in relay R460 in the repeater 300 operates and restores. When the signal-in relay R460 operates, it interrupts, at the contacts 461, the circuit for maintaining operated the reverse battery relay R430; and completes, at the contacts 463, a circuit, including the contacts 385, 345 and 486, for energizing the winding of the timer relay R560 in order to cause the latter relay to operate shortly thereafter, it being of the combination slow-to-operate and slow-to-release type. Also the signal-in relay R460 completes, at the contacts 464, a circuit, including the contacts 342 and the grounded hold conductor C301, for operating the control relay R470. Upon restoring the reverse battery relay R430 reverses, at the contacts 432, 433, 434, and 435, the polarity of the line conductors C311 and C312 of the trunk 310 with respect to the upper and lower windings of the line relay R390. Upon operating the timer relay R560 effects operation of the control relay R540; whereby the control relay R530 is operated. When the signal-in relay R460 then restores, it effects the restoration of the control relay R470 and the timer relay R560, the timer relay R560 effecting the restoration of the control relay R540 and the consequent restoration of the control relay R530 as previously explained. Also when the control relay R540 restores, it recompletes, at the contacts 541, the circuit for reoperating the reverse battery relay R430; whereby the latter relay again reverses, at the contacts 432, 433, 434 and 435, the polarity of the line conductors C311 and C312 of the trunk 310 with respect to the upper and lower windings of the line relay R390. This intermittent operation of the reverse battery relay R430 reversing the polarity of the loop circuit extending between the calling subscriber substation T2 and the upper and lower windings of the line relay R390 produces transients that are returned to the calling subscriber substation T2 in order to produce a clicking in the receiver threat indicating to the subscriber at the calling subscriber substation T2 that the subscriber at the called subscriber substation T1 has disconnected and constituting a disconnect signal.

The subscriber at the calling subscriber substation T2 then releases in order to bring about the restoration of the line relay R390 in the repeater 300; whereupon the repeater 300 governs the tone unit 501 in order to cause the release signal to be transmitted over the trunk line 515; then the repeater 300 is released together with the finder 232 and the selector 233; all in the manner previously explained. The tone unit 601 receives the release signal sent over the trunk line 515 in order to bring about the release of the repeater 600, the incoming selector 805 and the combination connector 804; all in the manner previously explained. At this time the established connection between the calling subscriber substation T2 in the central office 20 and the called subscriber substation T1 in the distant exchanger 30 is released and all of the apparatus involved therein is completely released and available for further use.

*Sect. 5.—Timing out of the repeaters*

Again assume that a call has been initiated at the subscriber substation T2 in the central office 20 and extended via the subscriber line 231, the finder 232, the selector 233 and the trunk 310 to the repeater 300; and that the repeater 300 has seized over the trunk line 515 the repeater 600; and that the repeater 600 has seized over the trunk 815, the incoming selector 805. At this time, should the subscriber at the calling subscriber substation T2 fail to dial a digit or a full complement of digits, the reverse battery relay R430 in the repeater 300 will not be operated. Similarly, after the full complement of digits has been dialed at the calling subscriber substation T2, should the combination connector 804 test the subscriber line 801 extending to the called subscriber substation T1 as busy or should the subscriber at the called subscriber substation T1 fail to answer the call after the subscriber line 801 extending thereto is selected by the combination connector 804 and ringing current is projected thereover, the reverse battery relay R430 in the repeater 300 will not be operated. Accordingly, in the event the reverse battery relay R430 fails to operate, ground potential upon the grounded hold conductor C301 is extended via the contacts 436 of the reverse battery relay R430 and the contacts 933 of the sleeve relay R930 to the contacts 333 of the time pulse relay R330. Accordingly, when ground potential is subsequently applied to the timer conductor C394, the previously traced circuit for energizing the lower winding of the time pulse relay R330 is completed; whereby the latter relay operates through its first step to complete, at the contacts 333, a substantially identical path for short-circuiting the upper winding thereof in order positively to prevent the time pulse relay R330 from operating through its second step at this time. Ground potential is retained upon the timer conductor C394 after it is applied thereto throughout a time interval of approximately one minute; and is then removed therefrom in order to interrupt the path for short-circuiting the upper winding of the time pulse relay R330. At this time a circuit including the grounded hold conductor C301, the contacts 436, 933 and 333, is completed for energizing in series the upper and lower windings of the time pulse relay R330; whereby the latter relay operates through its second step. When the time pulse relay R330 is operated through its second step, it completes, at the contacts 335, a connection, including the contacts 366 and 382', between the timer conductor C394 and the winding of the release relay R450. Also the time pulse relay R330 interrupts, at the contacts 331, the circuit for steadily illuminating the busy lamp L322 and for steadily illuminating the busy lamp L911 associated with the regular trunk jack J910 at the switchboard 900; and completes, at the contacts 332, a connection between the 60 impulse per minute conductor C337 and the conductor C302 in order to cause the busy lamps L322 and L911 to be flashed at 60 times per minute indicating the presence of one of the circumstances previously mentioned in conjunction with the call routed via the repeater 300. The next time ground potential is applied to the timer conductor C394, a circuit for operating the release relay R450 is completed; whereby the latter relay, upon operating, interrupts, at the contacts 454, the path for applying ground potential to the control conductor C313 of the trunk 310 in order to bring about the release of the selector 233 and the finder 232, as well as the release of the repeater 300 and the repeater 600. When the repeater 600 is thus released, any operated elements of the switch train, such, for example, as the incoming selector 805 and the combination connector 804 is released as previously explained. When the finder 232 is thus released, the line circuit, not shown, associated with the subscriber line 231 operates in order to mark the subscriber line 231 out of service unless the subscriber at the calling subscriber substation T2 has disconnected at this time.

Moreover, it may occur that a surge produced by lightning or the like may appear upon a trunk line, such, for example, as the trunk line 515 causing both of the tone units 501 and 601 respectively associated with the terminating repeaters 300 and 600 to respond as though a seizure signal were received over the trunk line 515. In this case, both of the repeaters 300 and 600 comprise in effect, called repeaters. More particularly, in the repeater 300 the signal-in relay R460 is operated and then restored; whereby certain relays therein, including the sequence relay R360, are operated; the sequence relay R360 completing, at the contacts 366, a connection, including the contacts 383' and 336, between the timer conductor C395 and the junction between the upper and lower windings of the time pulse relay R330. Accordingly, when ground potential is subsequently applied to the timer conductor C395, the time pulse relay R330 is operated through its first step; and after approximately five minutes, when ground potential is removed from the timer conductor C395, the time pulse relay R330 is operated through its second step connecting, at the contacts 335, the timer conductor C395 to the winding of the release relay R450. Subsequently, when ground potential is again connected to the timer conductor C395, the release relay R450 operates in order to bring about the release of the repeater 300 in the manner previously explained. Similarly, in the repeater 600, the signal-in relay R760 is operated and then restored; whereby the relays previously described, including the sequence relay R860 therein, are operated; the sequence relay R860 completing, at the contacts 866, a connection, including the contacts 883' and 836, between the timer conductor C895 and the junction between the upper and lower windings of the time pulse relay R830. Accordingly, when ground potential is subsequently applied to the timer conductor C895, the time pulse relay R830 is operated through its first step; and after approximately five minutes, when ground potential is removed from the timer conductor C895, the time pulse relay R830 is operated through its second step connecting, at the contacts 835, the time conductor C895 to the winding of the release relay R750. Subsequently, when ground potential is again connected to the timer conductor C895, the release relay R750 operates in order to bring about the release of the repeater 600 in the manner previously explained.

*Sect. 6.—A call from a subscriber substation in the distant exchange to a subscriber substation in the central office*

A call may be extended from a calling subscriber substation, such, for example, as the subscriber substation T1 in the distant exchange 30 to a called subscriber substation, such for example, as the subscriber substation T2 in the central office 20 via the subscriber line 801, the finder 802, the selector 803, the trunk 810, the repeater 600, the trunk line 515, the repeater 300, the trunk 315, the incoming selector 253, the trunk 243, the combination connector 234 and the subscriber line 231. In the extension of this connection, the repeater 600 comprises a calling repeater and operates in the manner of the repeater 300 described in Sect. 4, while the repeater 300 comprises a called repeater and operates in the manner of the repeater 600 described in Sect. 4; and all of the controls and supervisions therebetween are the same as explained in Sect. 4.

*Sect. 7.—Calls involving subscriber substations in the central office and subscriber substations in the remote exchange*

A call may be extended from a calling subscriber substation, such, for example, as the subscriber substation T2 in the central office 20 to a called subscriber substation, such, for example, as the subscriber substation T3 in the remote exhange 10 via the subscriber line 231, the finder 232, the selector 233, the trunk 242, the repeater 240, the trunk line 220, the repeater 210, the trunk 214, the incoming selector 205, the trunk 213, the combination connector 204 and the subscriber line 201 in a manner identical to that explained in Sect. 4; the repeater 240 constituting a calling repeater and the repeater 210 constituting a called repeater. Similarly, a call may be extended from a calling subscriber substation, such, for example, as the subscriber substation T3 in the remote exchange 10 to a called subscribed substation, such, for example, as the subscriber substation T2 in the central office 20 via the subscriber line 201, the finder 202, the selector 203, the trunk 212, the repeater 210, the trunk line 220, the repeater 240, the trunk 244, the incoming selector 235, the trunk 243, the combination connector 234, and the subscriber line 231 in a manner identical to that explained in Sect. 4; the repeater 210 constituting a calling repeater and the repeater 240 constituting a called repeater.

*Sect. 8.—A call from a subscriber substation in the remote exchange to a subscriber substation in the distant exchange*

Now assuming that a call is to be extended from a calling subscriber substation, such, for example, as the subscriber substation T3 in the remote exchange 10 to a called subscriber substation, such, for example, as the subscriber subtation T1 in the distant exchange 30, the subscriber at the calling subscriber substation T3 first initiates the call; whereby a loop circuit may be extended from the calling subscriber substation T3 via the subscriber line 201 and the finder 202 to the selector 203. The subscriber at the calling subscriber substation T3 then dials a first prefix digit; whereby the selector 203 operates to select the group of trunks, including the trunk 212 and then an idle trunk in the selected group. For example, the selector 203 may select the particular trunk 212 extending to the repeater 210; whereby the repeater 210 operates in conjunction with the tone unit 211 to transmit a seizure signal over the trunk line 220 to the repeater 240 and the connected tone unit 241; whereupon the repeater 240 operates to seize over the trunk 244, the incoming selector 235. The subscriber then dials a second prefix digit; whereby the repeater 210 in conjunction with the tone unit 211 operates to send a corresponding second prefix digit signal over the trunk line 220 to the repeater 240 and the associated tone unit 241; whereby a corresponding second prefix digit is repeated over the trunk 244 to the incoming selector 235 in order to cause the incoming selector 235 to select the group of trunks, including the trunk 310, and then an idle trunk in the selected group. For example, the incoming selector 235 may select the particular trunk 310 extending to the repeater 300; whereby the repeater 300 in conjunction with the tone unit 501 operates to transmit a seizure signal over the trunk line 515 to the repeater 600 and the associated tone unit 601; whereby the repeater 600 seizes the incoming selector 805 over the trunk 815; all in the manner explained in Sect. 4.

After the repeater 300 operates to send the seizure signal over the trunk line 515, the sequence relay R360 in the repeater 300 operates in order to complete, at the contacts 361, a path for applying ground potential through the lower winding of the tandem test relay R340 to the EC conductor C314 of the trunk 310; whereby the tandem test relay R340 tests to determine whether the calling circuit includes a repeater, as explained in Sect. 4. In the present example, the calling circuit extending from the calling subscriber substation T3 in the remote exchange 10 does include the repeater 240; whereby battery potential in the repeater 240 is applied through the upper winding of the tandem test relay therein to the EC conductor of the trunk 244 and thence through the incoming selector 235 to the EC conductor C314 of the trunk 310. Accordingly, the upper winding of the tandem test relay in the repeater 240 is energized in series circuit relation with the lower winding of the tandem test relay R340 in the repeater 300; whereby both of the tandem test relays operate in order to set the repeaters 240 and 300 for tandem operation since the connection extends between the terminating repeater 210 in the remote exchange 10 and the terminating repeater 600 in the distant exchange 30.

More particularly, upon operating the tandem test relay R340 interrupts, at the contacts 345, a further point in the previously traced circuit, including the contacts 463, 385 and 486, for operating the timer relay R560 under the control of the signal-in relay R460; prepares, at the contacts 343, a point in a circuit traced hereinafter for operating the release pulse timer relay R315; and completes, at the contacts 341, a multiple holding circuit, including the grounded hold conductor C301, for energizing the winding of the switch-through relay R480. Further the tandem test relay R340 interrupts, at the contacts 346, the path for applying ground potential to the pulse cut-in conductor C511 in order to cause the pulse cut-in relay in the tone unit 501 to restore preventing the tone unit 501 from responding to dial signals.

The subscriber at the calling subscriber substation T3 then proceeds to dial the third digit; whereby the repeater 210 responds and in conjunction with the associated tone unit 211, sends a corresponding digit signal over the trunk line 220. The digit signal sent over the trunk line 220 is in the form of a series of pulses of unmodulated 1000 cycle current as explained in Sect. 4. This digit signal sent over the trunk line 220 passes through the repeater 240, the trunk 244, the incoming selector 235, the trunk 310, the repeater 300 and the trunk line 515 into the tone unit 601 associated with the repeater 600; whereby the repeater 600 repeats a corresponding digit over the trunk 815 to the incoming selector 805 in order to control operation thereof in the manner explained in Sect. 4. Also the digit signal is received by the tone unit 501 but since the pulse cut-in relay in the tone unit 501 occupies its restored position, the impulse-in relay in the tone unit 501 does not respond repeating the digit over the dial-in conductor C510 to the dial-in relay R410 in the repeater 300. Accordingly, the tone unit 501 and consequently the repeater 300 does not respond to the digit signal sent through the repeater 300. For a similar reason, the tone unit 241 and consequently the repeater 240 does not respond to the digit signal sent through the repeater 240. Accordingly, in the present example, the third digit dialed at the calling subscriber substation T3 controls the terminating repeater 210 in the remote exchange 10 in order to bring about the control of the terminating repeater 600 in the distant exchange 30 without controlling the intermediate repeaters 240 and 300 in the central office 20.

In a similar manner, the subscriber at the calling subscriber substation T3 dials the fourth and fifth digits; whereby corresponding digit signals are sent from the repeater 210 over the connection to the repeater 600 and then repeated over the trunk 815; whereby the incoming selector 805 may be controlled to select the trunk 806 extending to the combination connector 804 and then the combination connector 804 may be controlled to select the subscriber line 801 extending to the called subscriber substation T1. The subsequent operation of the combination connector 804 depends upon the idle or busy condition of the subscriber substation T1 at this time as explained in Sect 4. Assuming that the called subscriber substation T1 is idle at this time, the ringer thereat is operated and when the subscriber at the called subscriber substation T1 answers the call, the repeater 600 is controlled in order to operate in conjunction with the associated tone unit 601 to return an answer signal in the form of a short splash of 60 cycle modulated 1000 cycle current over the connection to the repeater 210 in order to cause the repeater 210 to switch through into its answer position in an identical manner to that explained in Sect. 4; whereby the established connection is completed between the calling subscriber substation T3 in the remote exchange 10 and the called subscriber substation T1 in the distant exchange 30; which connection includes the subscriber line 201, the finder 202, the selector 203, the trunk 212, the repeater 210, the trunk line 220, the repeater 240, the trunk 244, the incoming selector 235, the trunk 310, the repeater 300, the trunk line 515, the repeater 600, the trunk 815, the incoming selector 805, the trunk 806, the combination connector 804 and the subscriber line 801.

The answer signal returned over the connection causes the tone unit 501 associated with the repeater 300 to respond; whereby the signal-in relay in the tone unit 501 operates and restores in order to cause ground potential to be applied to and then removed from the signal-in conductor C509; whereby the signal-in relay R460 in the repeater 300 operates and then restores. Upon operating the signal-in relay R460 completes, at the contacts 463, a circuit, including the contacts 384 and 343, for operating the release pulse timer relay R315; whereby the latter relay sets its armature RA316 into vibration in order to close intermittently the contacts 317 so that the winding of the release pulse timer relay R320 is energized intermittently; however, the release pulse timer relay R320, being of the slow-to-operate type, does not operate since the signal-in relay R460 is retained operated only a short time duration effecting the restoration of the release pulse timer relay R315 immediately and before the release pulse timer relay R320 has an opportunity to operate. Accordingly, the tone unit 501 and the repeater 300 do not effectively respond to the answer signal returned over the connection. For a similar reason the repeater 240 and the associated tone unit 241 do not effectively respond to the answer signal returned over the connection. Likewise, the repeaters 300 and 240 do not respond to disconnect and other supervisory signals sent over the connection for an identical reason.

However, at the conclusion of the established connection, when the subscriber at the calling subscriber substation T3 disconnects, the repeater 210 in conjunction with the tone unit 211 operates to send the release signal over the connection in the form of a long splash of 60 cycle modulated 1000 cycle current; whereby the repeater 210 and the repeater 600 are released bringing about the release of the selector 203, the finder 202, the incoming selector 805, and the combination connector 804; all in a manner identical to that explained in Sect. 4. However, in this case, when the tone unit 501 associated with the repeater 300 responds to the release signal, the signal-in relay R460 is retained operated sufficiently long to effect operation of the release pulse timer relay R320 under the control of the release pulse timer relay R315. Specifically, after a predetermined time interval, the vibrating armature RA316 of the release pulse timer relay R315 settles down completing continuously the circuit for operating the release pulse timer relay R320; whereby the latter relay operates, it being of the slow-to-operate type. Upon operating the release pulse timer relay R320 completes, at the contacts 321, a circuit, including the contacts 343, 384, and 463, for energizing the upper winding of the start timer relay R550; whereby the latter relay operates. Upon operating the start timer relay R550 effects operation of the timer relays R545, etc.; whereby the tone unit 501 in conjunction with the repeater 300 operates in order again to repeat a release signal over the trunk line 515, thereby positively to insure the release of the repeater 600. At the conclusion of the release signal received over the trunk 310 by the repeater 300, the tone unit 501 effects the restoration of the signal-in relay R460 and the consequent restoration of the release pulse timer relay R315 and the release pulse timer relay R320. At the conclusion of the sending of a release signal from the tone unit 501 and the repeater 300 over the trunk line 515, the repeater 300 is released in the manner explained in Sect. 4. The repeater 240 is released directly under the control of the repeater 210 effecting the release of the incoming selector 235. When the sequence relay R360 in the repeater is released, the holding circuit for retaining energized the upper winding of the tandem test relay in the repeater 240 and the lower winding of the tandem test relay R340 in the repeater 300 is interrupted; whereby the relays mentioned restore permitting the complete release of the repeaters 240 and 300 as explained above. At this time the established connection between the calling subscriber substation T3 in the remote exchange 10 and the called subscriber substation T1 in the distant exchange 30 is released and all of the apparatus involved therein is completely released and available for further use.

*Sect. 9.—A call from a subscriber substation in the distant exchange to a subscriber substation in the remote exchange*

In view of the explanation of Sect. 8, it will be understood that a call from a calling subscriber substation, such, for example, as the subscriber substation T1 in the distant exchange 30 may be extended to a called subscriber substation, such, for example, as the subscriber substation T3 in the remote exchange 10 via the subscriber line 801, the finder 802, the selector 803, the trunk 810, the repeater 600, the trunk line 515, the repeater 300, the trunk 315, the incoming selector 250, the trunk 242, the repeater 240, the trunk line 220, the repeater 210, the trunk 214, the incoming selector 205, the trunk 213, the combination connector 204 and the subscriber line 201. When this connection is completed, the terminating repeater 600 in the distant exchange 30 and the terminating repeater 210 in the remote exchange 10 interchange control and supervisory signals; while the intermediate repeaters 300 and 240 in the central office 10 are cut out as explained in Sect. 8. More particularly, when the second prefix digit is dialed at the calling subscriber substation T1, the incoming selector 250 is operated to select the trunk 242 extending to the repeater 240; whereby the repeater 240 operates in conjunction with the tone unit 241 to send a seizure signal over the trunk line 220. After the sending of the seizure signal from the repeater 240 over the trunk line 220, the sequence relay in the repeater 240 operates in order to close ground potential through the lower winding of the tandem test relay therein to the EC conductor of the trunk 242 and consequently through the incoming selector 250 to the EC conductor C319 of the trunk 315; whereby the upper winding of the tandem test relay R340 in the repeater 300 is energized in series with the lower winding of the tandem test relay in the repeater 240 causing the relays mentioned to operate. At this time, the switch-through relay R480 in the repeater 300 operates to bring about operation of the reverse battery relay R430 and to interrupt, at the contacts 489, the path for applying battery potential to the modulation cut-off conductor C508 in order to cause the modulation cut-off relay in the tone unit 501 to restore. At this time the intermediate repeaters 300 and 240 do not respond to supervisory and control signals. Subsequently, when the subscriber at the calling subscriber substation T1 disconnects, the repeater 600 in conjunction with the tone unit 601 operates to transmit the release signal over the trunk line 515 in order to effect the release of the repeaters 300 and 210. The repeater 240 in conjunction with the tone unit 241 operates to repeat the release signal over the trunk line 220 in order positively to insure the release of the repeater 210 as explained in Sect. 8. Of course, at this time, the finder 802, the selector 803, the incoming selector 250, the incoming selector 205, and the combination connector 204 are released; whereby the established connection between the calling subscriber substation T1 in the distant exchange 30 and the called subscriber substation T3 in the remote exchange 10 is released and all of the apparatus involved therein is completely released and available for further use.

*Sect. 10.—Calls from the switchboard in the central office to a subscriber substation in the distant exchange and to a subscriber substation in the remote exchange*

First assuming that a call is to be extended from the calling switchboard 900 in the central office 20 to a called subscriber substation, such for example, as the subscriber substation T1 in the distant exchange 30, the operator at the switchboard 900 selects an idle cord circuit, such, for example, as the cord circuit 960 and inserts the plug P961 thereof into the regular jack terminating a trunk extending to an idle repeater that, in turn, terminates a trunk line extending between the central office 20 and the remote exchange 30. For example, the plug P961 may be inserted into the regular trunk jack J910 terminating the trunk 310 extending to the repeater 300 assuming that the repeater 300 is idle at this time as indicated by the extinguished busy lamp L911 associated with the regular trunk jack J910. When the plug P961 is inserted into the regular jack J910, a circuit, including the sleeve of the regular jack J910, the sleeve of the plug P961, and the resistor 965 is completed for operating the sleeve relay R940 in the trunk circuit 920. Also the dial key K962 is operated in order to bridge the dial 964 across the tip and the ring of the plug P961. Upon operating the sleeve relay R940 completes, at the contacts 941, a path for applying ground potential to the control conductor C313 of the trunk 310 in order to effect operation of the out-seize relay R350 in the repeater 300. Also the tip and the ring of the plug P961 is bridged across the tip and the ring of the regular jack J910 and consequently the line conductors C311 and C312 of the trunk 310 in order to effect operation of the line relay R390 in the repeater 300. When the out-seize relay R350 and the line relay R390 in the repeater 300 are operated, the repeater 300 in conjunction with the tone unit 501 effects seizure of the repeater 600 and the incoming selector 805 in the manner explained in Sect. 4. The operator at the calling switchboard 900 then dials the three digits; whereby the repeater 300 in conjunction with the tone unit 501 sends three corresponding digit signals over the trunk line 515 to the repeater 600 and the associated tone unit 601 in order to bring about operation of the incoming selector 805 and the combination connector 804; whereby the subscriber line 801 extending to the called subscriber substation T1 is selected by the combination connector 804; all in the manner described in Sect. 4. After the three digits have been dialed at the calling switchboard 900, the operator thereat restores the dial key K962 and operates the talk key K961; whereby the dial 964 is disconnected from and the headset 963 is connected to the plug P961. The subsequent operation of the apparatus is the same as that described in Sect. 4; and during the established connection, the application of ground potential upon the control conductor C313 of the trunk 310 marks the trunk 310 as busy to the incoming selectors having access thereto. The supervision and ultimate release of the established connection between the calling switchboard 900 in the central office 20 and the called subscriber substation T1 in the distant exchange 30 is the same as described in Sect. 4. At the conclusion of the established connection, the operator at the switchboard 900 withdraws the plug P961 of the cord circuit 960 from the regular trunk jack J910 effecting the restoration of the sleeve relay R940 in the trunk circuit 920 and the line relay R390 and the out-seize relay R350 in the repeater 300.

In view of the foregoing description, it will be understood that the operator at the switchboard 900 may extend a call in an identical manner via the regular jack thereat associated with the trunk circuit 245 and thence via the trunk 242 to the repeater 240; which connection may be extended via the trunk line 220, the repeater 210, the trunk 214, the incoming selector 205; the trunk 213, the combination connector 204, and the subscriber line 201 to a called subscriber substation, such for example, as the subscriber substation T3 in the remote exchange 10. The completion of this connection as well as the ultimate release thereof is the same as described above.

*Sect. 11.—A call from the switchboard in the central office to a way station*

Now assuming that a call is to be extended from the switchboard 900 in the central office 20 to a way station, such, for example, as the way station W1, disposed between the central office 20 and the distant exchange 30, the operator at the switchboard 900 selects an idle cord circuit, such, for example, as the cord circuit 960 and immediately operates the talk key K961. The plug P961 is then inserted into the way station jack J903, assuming that the repeater 300 is idle at this time as indicated by the extinguished busy lamp L911. When the plug P961 is inserted into the way station jack J903, a circuit, including the sleeve of the way station jack J903, the sleeve of the plug P961 and the resistor 965, is completed for operating the sleeve relay R930 in the trunk circuit 920; and the headset 963 is bridged across the line conductor of the trunk line 315. Upon operating the sleeve relay R930 completes, at the contacts 932, a path for applying ground potential to the control conductor C313 of the trunk 310, thereby to bring about operation of the out-seize relay R350 in the repeater 300. Also the sleeve relay R930 completes, at the contacts 931, a path for bridging the impedance 912 across the line conductors C311 and C312 of the trunk 310 in order to bring about operation of the line relay R390 in the repeater 300. When the repeater 300 is thus seized, it operates in conjunction with the associated tone unit 501 to send a seizure signal over the trunk line 515; whereby the repeater 600 seizes over the trunk 815, the incoming selector 805; in the manner explained in Sect. 4.

However, at this time, the operator at the calling switchboard 900 does not dial any digit; whereby the repeater 600 is timed out and released in order to bring about the release of the incoming selector 805 after a time interval of five minutes as explained in Sect. 5, assuming that the established connection described hereinafter is retained completed for a time interval of five minutes or greater. However, upon operating the sleeve relay R930 interrupts, at the contacts 933, the previously traced circuit for energizing in series the upper and lower windings of the time pulse relay R330 in order to prevent timing out of the repeater 300 in the manner explained in Sect. 5. At this time the operator at the calling switchboard 900 proceeds to operate the ring key K963 in accordance with the code of the called way station W1, which code might be one short splash followed by one long splash of ringing current. More particularly, when the ring key K963 is operated, the connection to the headset 963 is opened and the connection including the interrupter generator conductor C967, the resistor 966 and battery potential, is completed to the respective negative and positive line conductors of the trunk line 515, which ringing current, projected over the trunk line 515, causes the ringer at the way station W1 to respond; however, the tone units 501 and 601 do not respond to this low frequency ringing current. Of course, the ringer at the way station W2 is also operated but the code indicates that the way station W1 is the called way station. When the person at the way station W1 answers the call, a connection is completed between the telephone instrument thereat and the line conductors of the trunk line 515 and consequently via the way station jack J903 and the plug P961 of the cord circuit 960 to the headset 963 at the switchboard 900. The operator at the calling switchboard 900 in the central office 20 then converses with the person at the called way station W1.

At the conclusion of this established connection, when the operator at the switchboard 900 withdraws the plug P961 from the way station jack J903, the sleeve relay R930 in the trunk circuit 920 restores effecting the release of the repeater 300. More particularly, the repeater 300 operates in conjunction with the tone unit 501 to send a release signal over the trunk line 515 to the repeater 600 in order to bring about the release of the repeater 600 and the incoming selector 805. It is noted that normally the repeater 600 is not timed out and released in the manner explained in Sect. 5 since the duration of the call between the calling switchboard 900 and the way station W1 is seldom maintained for a time interval of five minutes or greater. However, should the repeater 600 be timed out, the release of the repeater 300 sending a release signal over the trunk line 515 merely insures the positive release of the repeater 600 and is without particular effect. At this time the established connection between the calling switchboard 900 in the central office 20 and the called way station W1 disposed between the central office 20 and the distant exchange 30 is released and all of the apparatus involved therein is completely released and available for further use.

In view of the foregoing, it will be appreciated that a call may be extended from the switchboard 900 to the way station W2 in an identical manner employing a different code ringing operation of the ring key K963 in the cord circuit 960. Of course, it will be appreciated that instead of operating the ring key K963 in accordance with different codes that harmonic ringing may be employed utilizing different low frequencies corresponding to the different way stations W1, etc., connected to the trunk line 515, in view of the fact that such low frequency ringing current will not effect response of the tone units 501 and 601 respectively associated with the repeaters 300 and 600.

*Sect. 12.—A call from a way station to the switchboard in the central office*

Now assuming that a call is to be extended from one of the way stations, such, for example, as the way station W1 to the switchboard 900 in the central office 20, the person at the way station W1 initiates the call and operates the associated magneto generator; whereby a splash of magneto generator current is projected over the trunk line 515. This splash of magneto generator current does not effect operation of the tone units 501 and 601 respectively associated with the repeaters 300 and 600; however, it does bring about ringing down of the drop D902 through the contacts 951 and 952 and the condenser 901. The operator at the switchboard 900 observing the operated condition of the drop D902 selects an idle cord circuit, such, for example as the cord circuit 960 and inserts the plug P961 into the way station jack J903 bringing about the operation of the sleeve relay R930 in the trunk circuit 920. The sleeve relay R930 in the trunk circuit 920 brings about operation of the out-seize relay R350 and the line relay R390 in the repeater 300 as explained in Sect. 11; whereby the repeater 300 sends a seizure signal over the trunk line 515 effecting seizure of the repeater 600 and the consequent seizure of the incoming selector 805. Subsequently, the cut-off relay R950 in the trunk circuit 920 operates to clear, at the contacts 951 and 952, the drop D902 from the line conductors of the trunk line 515; whereby the operator at the switchboard 900 having operated the talk key K961 in the cord circuit 960 converses with the person at the calling way station W1 over the established connection. The subsequent release of this established connection is brought about when the operator withdraws the plug P961 of the cord circuit 960 from the way station jack J903 as explained in Sect. 11. Also the timing out of the repeater 600 in the event the established connection is maintained for a time interval of five minutes or greater proceeds in the manner explained in Sect. 5. However, calls from the way stations W1, etc., to the switchboard 900 are not normally maintained for a time interval as great as five minutes.

*Sect. 13.—Conclusions*

In view of the foregoing, it is apparent that there has been provided a telephone system comprising a plurality of exchanges interconnected by trunk lines and facility permitting connections to be set up over the trunk lines by automatic switching apparatus under the control of subscriber substations in the different exchanges; which connections are of the ordinary intertoll variety involving voice current repeaters and are of a character that normally require the assistance of a toll operator in the completion thereof. Also the telephone system comprises facility whereby telephone calls may be completed between an operator switchboard and one or more way stations directly connected to the trunk lines without interference with operation of the switching apparatus in the setting up of connections over the trunk lines.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a first exchange provided with first subscriber substations and first automatic switching apparatus accessible thereto, each of said first subscriber substations being provided with a digit transmitter, a second exchange provided with second subscriber substations and second automatic switching apparatus having access thereto, a trunk line extending between said exchanges and terminating in first and second repeaters respectively disposed in said first and second exchanges, said first repeater being accessible to said first switching apparatus and said second repeater having access to said second switching apparatus, means controllable from a calling one of said first subscriber substations for seizing said first switching apparatus and for operating it to seize said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said second switching apparatus, means including the digit transmitter at said one calling first subscriber substation for transmitting one or more digits each in the form of a corresponding series of impulses of direct current over said first switching apparatus to said first repeater, means included in said first repeater and responsive to reception of a digit for sending over said trunk line a corresponding digit signal in the form of a corresponding series of pulses of said given audio frequency carrier, and means included in said second repeater and responsive to reception of a digit signal for repeating to said second switching apparatus a corresponding digit in the form of a corresponding series of impulses of direct current in order to operate said second switching apparatus to extend the call to a called one of said second subscriber substations.

2. In a telephone system, a first exchange provided with first subscriber substations and first automatic switching apparatus accessible thereto, each of said first subscriber substations being provided with a digit transmitter, a second exchange provided with second subscriber substations and second automatic switching apparatus having access thereto, a trunk line extending between said exchanges and terminating in first and second repeaters respectively disposed in said first and second exchanges, said first repeater being accessible to said first switching apparatus and said second repeater having access to said second switching apparatus, means controllable from a calling one of said first subscriber substations for seizing said first switching apparatus and for operating it to seize said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said second switching apparatus, means including the digit transmitter at said one calling first subscriber substation for transmitting one or more digits each in the form of a corresponding series of impulses of direct current over said first switching apparatus to said first repeater, means included in said first repeater and responsive to reception of a digit for sending over said trunk line a corresponding digit signal in the form of a corresponding series of pulses of said given audio frequency carrier, means included in said second repeater and responsive to reception of a digit signal for repeating to said second switching apparatus a corresponding digit, in the form of a corresponding series of impulses of direct current in order to operate said second switching apparatus to extend the call to a called one of said second subscriber substations, and means controlled in the event no digit is transmitted to said first repeater within a predetermined time interval after seizure thereof for releasing said first and second switching apparatus and said first and second repeaters.

3. In a telephone system, a first exchange provided with first subscriber substations and first automatic switching apparatus accessible thereto, each of said first subscriber substations being provided with a digit transmitter, a second exchange provided with second subscriber substations and second automatic switching apparatus having access thereto, a trunk line extending between said exchanges and terminating in first and second repeaters respectively disposed in said first and second exchanges, said first repeater being accessible to said first switching apparatus and said second repeater having access to said second switching apparatus, means controllable from a calling one of said first subscriber substations for seizing said first switching apparatus and for operating it to seize said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said second switching apparatus, means including the digit transmitter at said one calling first subscriber substation for transmitting a full complement of digits each in the form of a corresponding series of impulses of direct current over said first switching apparatus to said first repeater, means included in said first repeater and responsive to reception of a digit for sending over said trunk line a corresponding digit signal in the form of a corresponding series of pulses of said given audio frequency carrier, means included in said second repeater and responsive to reception of a digit signal for repeating to said second switching apparatus a corresponding digit in the form of a corresponding series of impulses of direct current in order to operate said second switching apparatus to extend the call to a called one of said second subscriber substations, and means controlled in the event said full complement of digits is not transmitted to said first repeater within a predetermined time interval after seizure thereof for releasing said first and second switching apparatus and said first and second repeaters.

4. In a telephone system, a first exchange provided with first subscriber substations and first automatic switching apparatus accessible thereto, each of said first subscriber substations being provided with a digit transmitter, a second exchange provided with second subscriber substations and second automatic switching apparatus having access thereto, a trunk line extending between said exchanges and terminating in first and second repeaters respectively disposed in said first and second exchanges, said first repeater being accessible to said first switching apparatus and said second repeater having access to said second switching apparatus, means controllable from a calling one of said first subscriber substations for seizing said first switching apparatus and for operating it to seize said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said second switching apparatus, means including the digit transmitter at said one calling first subscriber substation for transmitting one or more digits each in the form of a corresponding series of impulses of direct current over said first switching apparatus to said first repeater, means included in said first repeater and responsive to reception of a digit for sending over said trunk line a corresponding digit signal in the form of a corresponding series of pulses of said given audio frequency carrier, means included in said second repeater and responsive to reception of a digit signal for repeating to said second switching apparatus a corresponding digit in the form of a corresponding series of impulses of direct current in order to operate said second switching apparatus to extend the call to a called one of said second subscriber substations, means included in said second repeater and responsive to answering of the call at said one called second subscriber substation for sending over said trunk line an answer signal in the form of a pulse of said given audio frequency carrier modulated by said predetermined lower frequency, and means included in said first repeater and responsive to reception of said answer signal for completing a communication connection between said one calling first subscriber substation and said one called second subscriber substation.

5. In a telephone system, a first exchange provided with first subscriber substations and first automatic switching apparatus accessible thereto, each of said first subscriber substations being provided with a digit transmitter, a second exchange provided with second subscriber substations and second automatic switching apparatus having access thereto, a trunk line extending between said exchanges and terminating in first and second repeaters respectively disposed in said first and second exchanges, said first repeater being accessible to said first switching apparatus and said second repeater having access to said second switching apparatus, means controllable from a calling one of said first subscriber substations for seizing said first switching apparatus and for operating it to seize said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said second switching apparatus, means including the digit transmitter at said one calling first subscriber substation for transmitting one or more digits each in the form of a corresponding series of impulses of direct current over said first switching apparatus to said first repeater, means included in said first repeater and responsive to reception of a digit for sending over said trunk line a corresponding digit signal in the form of a corresponding series of pulses of said given audio frequency carrier, means included in said second repeater and responsive to reception of a digit signal for repeating to said second switching apparatus a corresponding digit in the form of a corresponding series of impulses of direct current in order to operate said second switching apparatus to extend the call to a called one of said second subscriber substations, means included in said second repeater and responsive to answering of the call at said one called second subscriber substation for sending over said trunk line an answer signal in the form of a pulse of said given audio frequency carrier modulated by said predetermined lower frequency, means included in said first repeater and responsive to reception of said answer signal for completing a communication connection between said one calling first subscriber substation and said one called second subscriber substation, and means controlled in the event said answer signal is not received by said first repeater within a predetermined time interval after seizure thereof for releasing said first and second switching apparatus and said first and second repeaters.

6. In a telephone system, a first exchange provided with first subscriber substations and first automatic switching apparatus accessible thereto, each of said first subscriber substations being provided with a digit transmitter, a second exchange provided with second subscriber substations and second automatic switching apparatus having access thereto, a trunk line extending between said exchanges and terminating in first and second repeaters respectively disposed in said first and second exchanges, said first repeater being accessible to said first switching apparatus and said second repeater having access to said second switching apparatus, means controllable from a calling one of said first subscriber substations for seizing said first switching apparatus and for operating it to seize said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said second switching apparatus, means including the digit transmitter at said one calling first subscriber substation for transmitting one or more digits each in the form of a corresponding series of impulses of direct current over said first switching apparatus to said first repeater, means included in said first repeater and responsive to reception of a digit for sending over said trunk line a corresponding digit signal in the form of a corresponding series of pulses of said given audio frequency carrier, means included in said second repeater and responsive to reception of a digit signal for repeating to said second switching apparatus a corresponding digit in the form of a corresponding series of impulses of direct current in order to operate said second switching apparatus to extend the call to a called one of said second subscriber substations, means included in said second repeater and responsive to answering of the call at said one called second subscriber substation for sending over said trunk line an answer signal in the form of a pulse of said given audio frequency carrier modulated by said predetermined lower frequency, means included in said first repeater and responsive to reception of said answer signal for completing a communication connection between said one calling first subscriber substation and said one called second subscriber substation, means then controllable from said one calling first subscriber substation for releasing said first switching apparatus, means included in said first repeater and responsive to release of said first switching apparatus for sending over said trunk line a release signal in the form of a pulse of said given audio frequency carrier modulated by said predetermined lower frequency and then for releasing said first repeater, and means included in said second repeater and responsive to reception of said release signal for releasing said second switching apparatus and then for releasing said second repeater.

7. In a telephone system, a first exchange provided with first subscriber substations and first automatic switching apparatus accessible thereto, each of said first subscriber substations being provided with a digit transmitter, a second exchange provided with second subscriber substations and second automatic switching apparatus having access thereto, a trunk line extending between said exchanges and terminating in first and second repeaters respectively disposed in said first and second exchanges, said first repeater being accessible to said first switching apparatus and said second repeater having access to said second switching apparatus, means controllable from a calling one of said first subscriber substations for seizing said first switching apparatus and for operating it to seize said first repeater, means included in said first repeater and responsive to seizure thereof for sending over said trunk line a seizure signal in the form of a short pulse of a given audio frequency carrier modulated by a predetermined lower frequency, means included in said second repeater and responsive to reception of said seizure signal for seizing said second switching apparatus, means including the digit transmitter at said one calling first subscriber substation for transmitting one or more digits each in the form of a corresponding series of impulses of direct current over said first switching apparatus to said first repeater, means included in said first repeater and responsive to reception of a digit for sending over said trunk line a corresponding digit signal in the form of a corresponding series of pulses of said given audio frequency carrier, means included in said second repeater and responsive to reception of a digit signal for repeating to said second switching apparatus a corresponding digit in the form of a corresponding series of impulses of direct current in order to operate said second switching apparatus to extend the call to a called one of said second subscriber substations, means included in said second repeater and responsive to answering of the call at said one called second subscriber substation for sending over said trunk line an answer signal in the form of a short pulse of said given audio frequency carrier modulated by said predetermined lower frequency, means included in said first repeater and responsive to reception of said answer signal for completing a communication connection between said one calling first subscriber substation and said one called second subscriber substation, means then controllable from said one calling first subscriber substation for releasing said first switching apparatus, means included in said first repeater and responsive to release of said first switching apparatus for sending over said trunk line a release signal in the form of a long pulse of said given audio frequency carrier modulated by said predetermined lower frequency and then for releasing said first repeater, and means included in said second repeater and responsive to reception of said release signal for releasing said second switching apparatus and then for releasing said second repeater.

8. In a telephone system, a first exchange provided with first subscriber substations and first automatic switching apparatus accessible thereto, each of said first subscriber substations being provided with a digit transmitter, a second exchange provided with second subscriber substations and second automatic switching apparatus having access thereto, a trunk line extending between said exchanges and terminating in first and second repeaters respectively disposed in said first and second exchanges, said first repeater being accessible to said first switching apparatus and said second repeater having access to said second switching apparatus, means controllable from a calling one of said first subscriber substations for seizing said first switching apparatus and for operating it to seize said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said second switching apparatus, means including the digit transmitter at said one calling first subscriber substation for transmitting one or more digits each in the form of a corresponding series of impulses of direct current over said first switching apparatus to said first repeater, means included in said first repeater and responsive to reception of a digit for sending over said trunk line a corresponding digit signal in the form of a corresponding series of pulses of said given audio frequency carrier, means included in said second repeater and responsive to reception of a digit signal for repeating to said second switching apparatus a corresponding digit in the form of a corresponding series of impulses of direct current in order to operate said second switching apparatus to extend the call to a called one of said second subscriber substations, means included in said second repeater and responsive to answering of the call at said one called second subscriber substation for sending over said trunk line an answer signal in the form of a pulse of said given audio frequency carrier modulated by said predetermined lower frequency, means included in said first repeater and responsive to reception of said answer signal for completing a communication connection between said one calling first subscriber substation and said one called second subscriber substation, means included in said second repeater and responsive to disconnection at said one called second subscriber substation for sending over said trunk line a disconnect signal in the form of a series of pulses of said given audio frequency carrier modulated by said predetermined lower frequency, and means included in said first repeater and responsive to reception of said disconnect signal for repeating an audible signal over said first switching apparatus to said one calling first subscriber substation.

9. In a telephone system, a first exchange provided with a switchboard, said switchboard being provided with a digit transmitter, a second exchange provided with subscriber substations and automatic switching apparatus having access thereto, a trunk line extending between said exchanges and terminating in first and second repeaters respectively disposed in said first and second exchanges, said first repeater being accessible to said switchboard and said second repeater having access to said switching apparatus, means controllable from said switchboard for seizing said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said switching apparatus, means including the digit transmitter at said switchboard for transmitting one or more digits each in the form of a corresponding series of impulses of direct current to said first repeater, means included in said first repeater and responsive to reception of a digit for sending over said trunk line a corresponding digit signal in the form of a corresponding series of pulses of said given audio frequency carrier, means included in said second repeater and responsive to reception of a digit signal for repeating to said switching apparatus a corresponding digit in the form of a corresponding series of impulses of direct current in order to operate said switching apparatus to extend the call to a called one of said subscriber substations, a way station disposed intermediate said exchanges and provided with a signal device connected to said trunk line, additional means controllable from said switchboard for seizing said first repeater and for projecting an audio frequency ringing signal over said trunk line, said signal device being responsive to said ringing signal and non-responsive to said given audio frequency carrier, each of said repeaters being non-responsive to said ringing signal, and means controllable at said way station for answering a call extended thereto from said switchboard via said trunk line.

10. In a telephone system, a first exchange provided with a switchboard, said switchboard being provided with a digit transmitter, a second exchange provided with subscriber substations and automatic switching apparatus having access thereto, a trunk line extending between said exchanges and terminating in first and second repeaters respectively disposed in said first and second exchanges, said first repeater being accessible to said switchboard and said second repeater having access to said switching apparatus, means controllable from said switchboard for seizing said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said switching apparatus, means including the digit transmitter at said switchboard for transmitting one or more digits each in the form of corresponding series of impulses of direct current to said first repeater, means included in said first repeater and responsive to reception of a digit for sending over said trunk line a corresponding digit signal in the form of a corresponding series of pulses of said given audio frequency carrier, means included in said second repeater and responsive to reception of a digit signal for repeating to said switching apparatus a corresponding digit in the form of a corresponding series of impulses of direct current in order to operate said switching apparatus to extend the call to a called one of said subscriber substations, a way station disposed intermediate said exchanges and provided with a signal device connected to said trunk line, additional means controllable from said switchboard for seizing said first repeater and for projecting an audio frequency ringing signal over said trunk line, said signal device being responsive to said ringing signal and non-responsive to said given audio frequency carrier, each of said repeaters being non-responsive to said ringing signal, means controllable at said way station for answering a call extended thereto from said switchboard via said trunk line, and means controlled in the event no digit signal is received by said second repeater a predetermined time interval after seizure thereof for releasing said second repeater and said switching apparatus.

11. In a telephone system, a first exchange provided with a switchboard, said switchboard being provided with a digit transmitter, a second exchange provided with subscriber substations and automatic switching apparatus having access thereto, a trunk line extending between said exchanges and terminating in first and second repeaters respectively disposed in said first and second exchanges, said first repeater being accessible to said switchboard and said second repeater having access to said switching apparatus, means controllable from said switchboard for seizing said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said switching apparatus, means including the digit transmitter at said switchboard for transmitting one or more digits each in the form of a corresponding series of impulses of direct current to said first repeater, means included in said first repeater and responsive to reception of a digit for sending over said trunk line a corresponding digit signal in the form of a corresponding series of pulses of said given audio frequency carrier, means included in said second repeater and responsive to reception of said digit signal for repeating to said switching apparatus a corresponding digit in the form of a corresponding series of impulses of direct current in order to operate said switching apparatus to extend the call to a called one of said subscriber substations, a way station disposed intermediate said exchanges and provided with a ringing signal generator, said switchboard being provided with a signal device connected to said trunk line, means controllable from said way station for connecting said generator to said trunk line and for operating it to project an audio frequency ringing signal thereover, said signal device being responsive to said ringing signal and non-responsive to said given audio frequency carrier, each of said repeaters being non-responsive to said ringing signal, means controllable at said switchboard for answering a call extended thereto from said way station via said trunk line, and additional means responsive to answering of a call at said switchboard for seizing said first repeater.

12. In a telephone system, a first exchange provided with a switchboard, said switchboard being provided with a digit transmitter, a second exchange provided with subscriber substations and automatic switching apparatus having access thereto, a trunk line extending between said exchanges and terminating in first and second repeaters respectively disposed in said first and second exchanges, said first repeater being accessible to said switchboard and said second repeater having access to said switching apparatus, means controllable from said switchboard for seizing said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said switching apparatus, means including the digit transmitter at said switchboard for transmitting one or more digits each in the form of a corresponding series of impulses of direct current to said first repeater, means included in said first repeater and responsive to reception of a digit for sending over said trunk line a corresponding digit signal in the form of a corresponding series of pulses of said given audio frequency carrier, means included in said second repeater and responsive to reception of said digit signal for repeating to said switching apparatus a corresponding digit in the form of a corresponding series of impulses of direct current in order to operate said switching apparatus to extend the call to a called one of said subscriber substations, a way station disposed intermediate said exchanges and provided with a ringing signal generator, said switchboard being provided with a signal device connected to said trunk line, means controllable from said way station for connecting said generator to said trunk line and for operating it to project an audio frequency ringing signal thereover, said signal device being responsive to said ringing signal and non-responsive to said given audio frequency carrier, each of said repeaters being non-responsive to said ringing signal, means controllable at said switchboard for answering a call extended thereto from said way station via said trunk line, additional means responsive to answering of a call at said switchboard for seizing said first repeater, and means controlled in the event no digit signal is received by said second repeater a predetermined time interval after seizure thereof for releasing said second repeater and said switching apparatus.

13. In a telephone system, a first exchange provided with a switchboard, said switchboard being provided with a digit transmitter, a second exchange provided with subscriber substations and automatic switching apparatus having access thereto, a trunk line extending between said exchanges and terminating in first and second repeaters respectively disposed in said first and second exchanges, said first repeater being accessible to said switchboard and said second repeater having access to said switching apparatus, means controllable from said switchboard for seizing said first repeater, means included in said first repeater and responsive to seizure thereof for sending over said trunk line a seizure signal in the form of a pulse of a given audio frequency carrier modulated by a predetermined lower frequency, means included in said second repeater and responsive to reception of said seizure signal for seizing said switching apparatus, means including the digit transmitter at said switchboard for transmitting one or more digits each in the form of corresponding series of impulses of direct current to said first repeater, means included in said first repeater and responsive to reception of a digit for sending over said trunk line a corresponding digit signal in the form of a corresponding series of pulses of said given audio frequency carrier, means included in said second repeater and responsive to reception of a digit signal for repeating to said switchng apparatus a corresponding digit in the form of a corresponding series of impulses of direct current in order to operate said switching apparatus to extend the call to a called one of said subscriber substations, said switchboard being provided with a first signal device connected to said trunk line, a way station disposed intermediate said exchanges and provided with a second signal device connected to said trunk line and a ringing signal generator, additional means controllable from said switchboard for seizing said first repeater and for projecting an audio frequency ringing signal over said trunk line, said second signal device being responsive to said ringing signal and non-responsive to said given audio frequency carrier, means controllable at said way station for answering a call extended thereto from said switchboard via said trunk line, means controllable from said way station for connecting said generator to said trunk line and for operating it to project an audio frequency ringing signal thereover, said first signal device being responsive to said ringing signal and non-responsive to said given audio frequency carrier, means controllable at said switchboard for answering a call extended thereto from said way station via said trunk line, each of said repeaters being non-responsive to said ringing signal, and further means responsive to answering of a call at said switchboard for seizing said first repeater.

JOHN WICKS.

REFERENCES CITED

The following references are of record in the file of this patent:

UNITED STATES PATENTS

| Number | Name | Date |
|---|---|---|
| 1,473,671 | Davidson | Nov. 13, 1923 |
| 1,941,085 | Hague | Dec. 26, 1933 |
| 2,120,994 | Tidd | June 21, 1938 |
| 2,232,362 | Bellows | Feb. 18, 1941 |
| 2,254,113 | Wicks | Aug. 26, 1941 |
| 2,275,459 | Myquist | Mar. 10, 1942 |
| 2,351,766 | Joel | June 20, 1944 |
| 2,375,053 | Vaughan | May 1, 1945 |
| 2,376,352 | Gillings | May 22, 1945 |
| 2,381,769 | Molnar | Aug. 7, 1945 |
| 2,407,150 | Gillings | Sept. 3, 1946 |
| 2,423,123 | Stewart | July 1, 1947 |
| 2,424,452 | Gillings | July 22, 1947 |
| 2,467,490 | McClew | Apr. 19, 1949 |
| 2,486,100 | Beale | Oct. 25, 1949 |

FOREIGN PATENTS

| Number | Country | Date |
|---|---|---|
| 489,609 | Great Britain | July 25, 1938 |